United States Patent
Williams et al.

(10) Patent No.: US 6,934,696 B1
(45) Date of Patent: Aug. 23, 2005

(54) CUSTOM RULE SYSTEM AND METHOD FOR EXPERT SYSTEMS

(75) Inventors: Scott T. Williams, Minden, NV (US); Alan T. Schachtely, Minden, NV (US)

(73) Assignee: Bently Nevada, LLC, Minden, NV (US)

(*) Notice: Subject to any disclaimer, the term of this patent is extended or adjusted under 35 U.S.C. 154(b) by 383 days.

(21) Appl. No.: 09/663,325

(22) Filed: Sep. 15, 2000

(51) Int. Cl.[7] .............................. G06F 17/00; G06N 5/00
(52) U.S. Cl. ........................ 706/47; 706/11; 706/46
(58) Field of Search ............................... 706/11, 47, 46

(56) References Cited

U.S. PATENT DOCUMENTS

| | | |
|---|---|---|
| 4,591,983 A | 5/1986 | Bennett et al. |
| 4,628,435 A | 12/1986 | Tashiro et al. |
| 4,644,479 A | 2/1987 | Kemper |
| 4,719,586 A | 1/1988 | Moyer et al. |
| 4,803,039 A | 2/1989 | Impink, Jr. et al. |
| 4,815,014 A | 3/1989 | Lipner et al. |
| 4,839,823 A | 6/1989 | Matsumoto |
| 4,853,175 A | 8/1989 | Book, Sr. |
| 4,855,923 A | 8/1989 | Fullmer |
| 4,858,102 A | 8/1989 | Lovrenich |
| 4,947,095 A | 8/1990 | Kawamura et al. |
| 5,068,080 A | 11/1991 | Impink, Jr. et al. |
| 5,099,436 A | 3/1992 | McCown et al. |
| 5,119,318 A | 6/1992 | Paradies et al. |
| 5,148,363 A | 9/1992 | Sakamoto et al. |
| 5,161,110 A | 11/1992 | Dorchak |
| 5,189,604 A | 2/1993 | Lovrenich |
| 5,195,029 A | 3/1993 | Murai et al. |
| 5,214,577 A | 5/1993 | Sztipanovits et al. |
| 5,216,612 A | 6/1993 | Cornett et al. |
| 5,239,547 A | 8/1993 | Tomiyama et al. |
| 5,249,260 A | 9/1993 | Nigawara et al. |
| 5,251,144 A | 10/1993 | Ramamurthi |
| 5,267,141 A | 11/1993 | Morita et al. |
| 5,305,426 A | 4/1994 | Ushioda et al. |
| 5,333,240 A | 7/1994 | Matsumoto et al. |
| 5,355,444 A | 10/1994 | Chirico |
| 5,398,304 A | 3/1995 | Bauman et al. |
| 5,402,526 A | 3/1995 | Bauman et al. |
| 5,403,447 A | 4/1995 | Järvinen et al. |
| 5,406,502 A | 4/1995 | Haramaty et al. |
| 5,412,756 A | 5/1995 | Bauman, Jr. et al. |
| 5,414,632 A | 5/1995 | Mochizuki et al. |
| 5,442,562 A | 8/1995 | Hopkins et al. |
| 5,450,545 A | 9/1995 | Martin et al. |
| 5,452,453 A | 9/1995 | Ando et al. |
| 5,463,545 A | 10/1995 | Umeda et al. |
| 5,463,567 A | 10/1995 | Boen et al. |
| 5,493,633 A | 2/1996 | Obata |
| 5,511,004 A | 4/1996 | Dubost et al. |
| 5,521,844 A | 5/1996 | Karis |
| 5,541,832 A | 7/1996 | Nakajima et al. |
| 5,551,030 A | 8/1996 | Linden et al. |
| 5,557,549 A | 9/1996 | Chang |
| 5,559,691 A | 9/1996 | Monta et al. |
| 5,561,610 A | 10/1996 | Schricker et al. |
| 5,594,899 A | 1/1997 | Knudsen et al. |
| 5,617,514 A | 4/1997 | Dolby et al. |
| 5,630,025 A | 5/1997 | Dolby et al. |
| 5,659,743 A | 8/1997 | Adams et al. |
| 5,787,234 A | 7/1998 | Molloy |
| 5,796,394 A | 8/1998 | Wicks et al. |
| 5,802,255 A | 9/1998 | Hughes et al. |
| 5,870,308 A | 2/1999 | Dangelo et al. |
| 5,905,989 A | 5/1999 | Biggs |
| 6,002,854 A | 12/1999 | Lynch et al. |
| 6,016,960 A | 1/2000 | Liu |
| 6,057,841 A * | 5/2000 | Thurlow et al. ............ 345/809 |
| 6,065,002 A | 5/2000 | Knotts et al. |
| 6,314,415 B1 | 11/2001 | Mukherjee .................. 706/47 |

* cited by examiner

Primary Examiner—Anthony Knight
Assistant Examiner—Joseph P. Hirl
(74) Attorney, Agent, or Firm—Dennis A. DeBoo

(57) ABSTRACT

A custom rule system and method that stores custom rules as rule steps and then displays these rule steps as graphical depictions such that these graphical depictions can be selected and interconnected to visually form custom rules for an expert system.

10 Claims, 17 Drawing Sheets

Rule Groups

| rule_group_id | integer |
|---|---|
| rule_group_guid | replid |
| group_priority | integer |
| is_rule_group_active | boolean |
| rule_group_text_id | long int |
| rule_group_text | text(50) |
| rule_type | integer |
| is_password_active | boolean |
| rule_group_password | text(50) |

Rules

| rule_id | long int |
|---|---|
| beg_rule_conf_id | long int |
| end_rule_conf_id | long int |
| rule_text | text(60) |
| rule_text_id | long int |
| is_valid | boolean |
| is_active | boolean |
| is_deleted | boolean |
| rule_priority | long int |
| rule_group_id | integer |
| component_key | long int |
| num_result_steps | integer |

Rule Steps

| rule_id | long int |
|---|---|
| beg_rule_conf_id | long int |
| end_rule_conf_id | long int |
| step_num | long int |
| vert_positon_num | long int |
| horz_position_num | long int |
| operation_id | integer |

Rule Connections

| rule_id | long int |
|---|---|
| beg_rule_conf_id | long int |
| end-rule_conf_id | long int |
| connection_num | long int |
| from_step_num | long int |
| from_output_num | integer |
| to_step_num | long int |
| to_input_num | integer |

Rule Step Inputs

| rule_id | long int |
|---|---|
| beg_rule_conf_id | long int |
| end_rule_conf_id | long int |
| step_num | long int |
| input_num | integer |
| value_type | integer |
| step_input_enum_id | long int |

*Fig. 20* — 268

Rule Step Outputs

| rule_id | long int |
|---|---|
| beg_rule_conf_id | long int |
| end_rule_conf_id | long int |
| step_num | long int |
| output_num | integer |
| value_type | integer |
| b_value | boolean |
| f_value | float |
| i_value | long int |
| e_value | long int |
| units | byte |
| sub_units | byte |
| field_id | long int |
| component_key | long int |
| step_output_enum_id | long int |
| loop_num | integer |

*Fig. 21* — 270

Result Steps

| rule_id | long int |
|---|---|
| beg_rule_conf_id | long int |
| end_rule_conf_id | long int |
| step_num | long int |
| result_type | long int |
| multiple_severities | bool |
| create_severity_0_result | bool |
| auto_status_checking | bool |
| no_result | bool |

*Fig. 22* — 272

Derived Value Steps — 274

| | |
|---|---|
| rule_id | long int |
| beg_rule_conf_id | long int |
| end_rule_conf_id | long int |
| step_num | long int |
| derived_value_id | long int |

*Fig. 23*

System Options — 276

| | |
|---|---|
| system_options_key | integer |
| database_major_version | byte |
| database_minor_version | byte |
| database_custom_version | byte |

*Fig. 24*

Class Hierarchy — 278

| | |
|---|---|
| component_type | long int |
| ancestor_component_type | long int |
| ancestor_level | byte |

*Fig. 25*

English Text — 280

| | |
|---|---|
| text_id | long int |
| english_text | text(255) |

*Fig. 26*

English Memo Text — 282

| | |
|---|---|
| text_id | long int |
| english_memo_text | memo |

*Fig. 27*

Properties Text — 284

| | |
|---|---|
| property_texts_id | integer |
| pp_text_id | long int |
| ds_text_id | long int |
| rack_text_id | long int |
| mon_text_id | long int |
| chan_text_id | long int |
| t_text_id | long int |

*Fig. 28*

CUSTOM RULE SYSTEM AND METHOD FOR EXPERT SYSTEMS

FIELD OF THE INVENTION

The present invention relates generally to a custom rule system and method for expert systems and, in particular, to a custom rule system and method for creating custom rules for an expert system employed for protecting and managing assets including machinery.

BACKGROUND OF THE INVENTION

Currently, expert system shells are employed to provide a framework in which users construct expert systems for, inter alia, protecting and managing assets including machinery.

Typically, and in essence, a developer constructs an expert system by first employing an expert system shell for building an application by creating a graphic model of the system, which essentially results in a schematic diagram of the application. Rules are then written in a computer language for the application and contain an expert's knowledge of what the expert system should conclude and how it should respond to a given set of conditions: what to conclude from trends, how to determine a failure, what actions to take to minimize loss and maximize safety and productivity, and so forth.

One exemplary expert system is that which is sold under the name Machine Condition Manager™ 2000 by, the assignee of the present application, Bently Nevada Corporation of Minden, Nev. This system has the powerful ability to, inter alia, allow new attributes and rule sets to be appended thereto and represents a new paradigm for automated diagnostic and machinery information management. Please see the commonly assigned U.S. Pat. No. 5,905,989, filed Nov. 27, 1996 of Biggs, entitled "Knowledge manager Relying On A Hierarchical Default Expert System: Apparatus and Method," which is hereby incorporated by reference in its entirety.

Notwithstanding, new or custom rules that need to be written for an expert system require a user to author them in a computer language, which makes writing new rules very difficult. Typically, rules are written in a text, with the help of a text editor. A parser converts the text into symbols that are then sent to an interpreter or compiler in order to obtain a resultant rule. Thus, the user must learn the computer language in which the rules are to be written for each particular expert system and, in addition, the user must learn and understand the way previous rules, where written for that particular expert system. This is a large time investment before a single rule can be written. The creation of rules that are not syntactically correct is ubiquitous even with the computer language learned and the expert system understood.

Additionally, some type of wizard interface may be employed to ask questions and then write code from the answers. However, this is still problematic in that text has to be parsed in order for it to be converted into symbols that are then sent to an interpreter or compiler in order to obtain a resultant rule and the user may still have to understand the way previous rules where written.

Accordingly, there is a need for a system and method that allows users of rule based expert systems to be able to easily write their own additional rules without having to learn a computer language and without understanding how any particular expert system works. Additionally, there is a need for a system and method that allows users of rule based expert systems to be able to easily write their own additional rules without effecting the execution of other rules in the expert system. Furthermore, there is need for a system and method that eliminates the possibility of creating custom rules that are not syntactically correct and thus, not valid for execution. Heretofore, the approach to writing rules was to let users create anything they wanted and then give them a list of errors that needed to be interpreted, edited, parsed and compiled until a valid rule was obtained. Moreover, there is a need for a system and method that decreases the time spent on creating and processing custom rules.

SUMMARY OF THE INVENTION

The present invention is distinguished over the known prior art in a multiplicity of ways. For one thing, the present invention provides a system and method that allows users of rule based expert systems to be able to easily write their own additional rules without having to learn a computer language, without understanding how any particular expert system works, and without effecting the execution of other rules in the expert system. Additionally, the present invention provides a system and method that eliminates the possibility of creating custom rules that are not syntactically correct and thus, not valid for execution. Furthermore, the present invention provides a system and method that decreases the time spent on creating and processing custom rules.

In one preferred form, the present invention includes a plurality of rule steps individually stored within a memory or database. The memory or database is operatively coupled to at least one computer having a display and interface for displaying a rules window and for graphically displaying an arrangement comprised of the stored rule steps. Individual rule steps that are to be utilized for creating a custom rule are selected, dragged, and dropped from the displayed arrangement to the rules window. The rule steps within the rules window are appropriately connected to create a custom rule and references to these rule steps, connections and data associated with these rules and connections are stored such that the computer knows the steps, the connections and data to employ when executing the created custom rule.

Thus, one hallmark of the present invention is that it provides a system and method that stores custom rules as rule steps and then displays these rule steps as graphical depictions such that these graphical depictions can be selected and interconnected to visually form custom rules.

OBJECTS OF THE INVENTION

Accordingly, a primary object of the present invention is to provide a new, novel and useful custom rule system and method for creating custom rules for an expert system employed for protecting and managing assets including machinery.

A further object of the present invention is to provide a custom rule system and method as characterized above that allows users of rule based expert systems to be able to easily write their own additional rules without having to learn any type of computer language and without having to understand how any particular expert system works.

Another further object of the present invention is to provide a custom rule system and method that allows users of rule based expert systems to be able to easily write their own additional rules without effecting the execution of other rules in the expert system.

Another further object of the present invention is to provide a custom rule system and method that eliminates the possibility of creating custom rules that are neither syntactically correct nor valid for execution.

Another further object of the present invention is to provide a custom rule system and method for creating custom rules without having to write code that has to be parsed thereby eliminating the need for a parser and without having to fix return errors.

Another further object of the present invention is to provide a custom rule system and method that allows rules to be created and stored as steps in a ready to process format in a database thereby providing fast rule execution.

Another further object of the present invention is to provide a custom rule system and method that stores custom rules as executable steps that can have inputs and outputs that can be interconnected.

Another further object of the present invention is to provide a custom rule system and method that allows rule steps to run independently of one another.

Another further object of the present invention is to provide a custom rule system and method that includes a very simple custom rule interface that is easy to use and understand thereby allowing fast and easy rule entry.

Another further object of the present invention is to provide a custom rule system and method that provides a very simple custom rule interface that allows users to visually create rules from stored rule steps by selecting, dragging and dropping graphical rule steps correlative of the stored rules steps, interconnecting graphical rule step outputs to graphical rule step inputs and performing any required configuration of each step to create new custom rules.

Another further object of the present invention is to provide a custom rule system and method that only allows connections to be made from a rule step output to a rule step input when the type being output matches one of the valid types for the input thereby allowing the user to only interconnect the steps in a manner that is valid for execution precluding the creation of invalid rules or syntax errors.

Another further object of the present invention is to provide a custom rule system and method that verifies the input type and step execution order during rule creation thereby precluding users from creating invalid rules.

Another further object of the present invention is to provide a custom rule system and method that allows users to easily define custom rules and calculations that drive recommended actions based on asset problems.

Another further object of the present invention is to provide a custom rule system and method that allows users to visually create and interconnect rules from rule steps only in a manner that is valid for execution.

Another further object of the present invention is to provide a custom rule system and method that includes a user interface and rule step processing method that precludes infinite loops from being created.

Yet another object of the present invention is to provide a custom rule system and method that allows, inter alia, logic, arithmetic, statistical, switch, status, and result logic to be tied together and verified visually.

Still yet another object of the present invention is to provide a custom rule system and method that integrates operator precedence within the way the rule steps are connected such that the rule creator does not need to understand it.

Viewed from a first vantage point, it is an object of the instant invention to provide a custom rule system for creating custom rules, said custom rule system comprising in combination: a processor, a memory and a display both operatively coupled to said processor; a plurality of rule steps stored within said memory; means for graphically depicting said plurality of rule steps stored within said memory as an arrangement on said display; means for selecting at least one of said graphically depicted rule steps from said arrangement for visually creating a custom rule on said display.

Viewed from a second vantage point, it is an object of the instant invention to provide a custom rule system for creating custom rules, said system comprising in combination: a database comprised of a multiplicity of rule steps, each said rule step having specific executable code associated therewith; a computer operatively coupled to said database and including a display for graphically depicting said rule steps in an array and for providing a graphical window; means for interacting with said array to select and place said graphically depicted rule steps from said array to said graphical window for graphical display; means for interconnecting said graphically displayed rule steps within said graphical window for creating a custom rule.

Viewed from a third vantage point, it is an object of the instant invention to provide a custom rule system for creating custom rules, said system comprising in combination: an arrangement of graphically depicted rule steps, each said graphically depicted rule step having assembled code associated therewith and stored within a database; means for individually selecting said graphically depicted rules steps from said arrangement and disposing said selected rules in a graphical window such that said selected rules are arranged in a substantially columnar format; means for graphically interconnecting said selected rule steps disposed in said graphical window, and means for storing said graphically interconnected selected rule steps disposed in said graphical window as a custom rule to be employed for decision making in an expert system.

Viewed from a fourth vantage point, it is an object of the instant invention to provide a custom rule system, comprising in combination: a database; a plurality of rule steps stored within said database; a plurality of tables stored within said database, each of said plurality of tables having at least one record including at least one field; a plurality of step references stored within at least one of said plurality of tables, each of said plurality of step references associated with at least one of said rule steps stored within said database; a plurality of rule references stored within at least one of said plurality of tables, each of said plurality of rule references associated with at least one of said rule step references stored within said database, and wherein all of the step references that are associated with the same rule reference define each individual rule step that is included in an individual, user created custom rule.

Viewed from a fifth vantage point, it is an object of the instant invention to provide a A custom rule system, comprising in combination: a database; a plurality of rule steps stored within said database as executable code; a plurality of tables stored within said database, each having at least one record containing fields; a plurality of said fields including step references to individual rule steps stored within said database for defining a custom rule.

Viewed from a sixth vantage point, it is an object of the instant invention to provide a custom rule system for creating custom rules, said system comprising in combination: individual rule steps stored within a database coupled to a computer; means for graphically depicting said rules steps on a display of said computer; means for selecting and interconnecting a plurality of said graphically depicted rule steps for visually forming a custom rule in a graphical window of said display.

Viewed from a seventh vantage point, it is an object of the instant invention to provide a A custom rule system for creating custom rules on a computer having a display, said system comprising in combination: an arrangement of graphically depicted rule steps displayed on said display and having inputs, outputs, or both inputs and outputs; means for connecting outputs of said graphically depicted rule steps to inputs of said graphically depicted rule steps for visually creating a custom rule.

Viewed from a eight vantage point, it is an object of the instant invention to provide a method for creating custom rules, the steps including: storing individual rule steps comprised of executable code within a database coupled to a computer; depicting said rules steps on a display of said computer as a graphical arrangement of icons; creating a custom rule by interfacing with said graphical arrangement of icons.

Viewed from a ninth vantage point, it is an object of the instant invention to provide a method for creating custom rules, the steps including: selecting an asset for a custom rule; defining input value steps to be used in the custom rule; each said input value step including at least one output; depicting said input value steps in a graphical window of a graphical user interface of a computer; depicting a matrix of graphically depicted rule steps on said graphical user interface, each said graphically depicted rule step having assembled rule step code associated therewith and stored within a database coupled to said computer; selecting a result step from said matrix of graphically depicted rule steps and placing said result step into said graphical window, said result step including at least one input; defining a result that will be created when an input to said selected result step is true; selecting at least one operation step from said matrix of graphically depicted rule steps and placing said at least one operation step into said graphical window at a location interposed between said input value steps and said result step, said at least one operation step having at least one input and at least one output; connecting said at least one output of each of said input value steps to said at least one input of said operation step, and connecting said at least one output of said operation step to said at least one input of said result step for creating a custom rule.

Viewed from a tenth vantage point, it is an object of the instant invention to provide a custom rule system, comprising in combination: a database; a multiplicity of text identifier numbers stored within said database; means for storing a table comprised of text associated with said multiplicity of text identifier numbers; means for returning text from said table to said system for each of said multiplicity of text identifier numbers stored within said database upon demand such that said database can be written and stored as said multiplicity of text identifier numbers.

These and other objects and advantages will be made manifest when considering the following detailed specification when taken in conjunction with the appended drawing figures.

BRIEF DESCRIPTION OF THE DRAWINGS

FIG. 16 illustrates a rule groups table including a record and its included fields.

FIG. 17 illustrates a rules table including a record and its included fields.

FIG. 18 illustrates a rule steps table including a record and its included fields.

FIG. 19 illustrates a rule connections table including a record and its included fields.

FIG. 20 illustrates a rule step inputs table including a record and its included fields.

FIG. 21 illustrates a rule outputs table including a record and its included fields.

FIG. 22 illustrates a result steps table including a record and its included fields.

FIG. 23 illustrates a derived value steps table including a record and its included fields.

FIG. 24 illustrates a system options table including a record and its included fields.

FIG. 25 illustrates a class hierarchy table including a record and its included fields.

FIG. 26 illustrates an English text table including a record and its included fields.

FIG. 27 illustrates a English memo text table including a record and its included fields.

FIG. 28 illustrates a properties text table including a record and its included fields.

DESCRIPTION OF PREFERRED EMBODIMENTS

Figure 1:
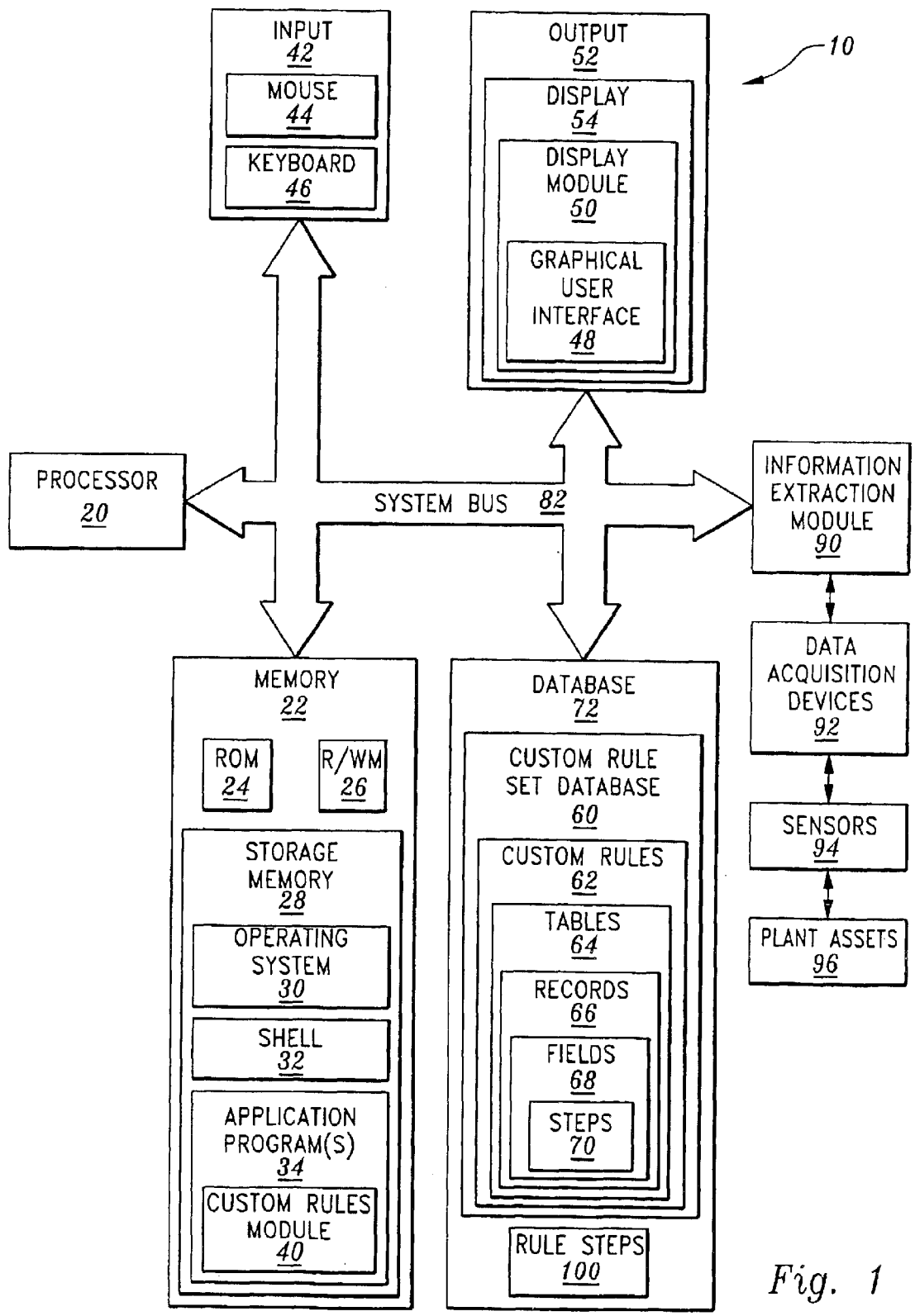
FIG. 1 is a schematic of the custom rule system according to the present invention and including a database having custom rules stored as rule steps therein.

Considering the drawings, wherein like reference numerals denote like parts throughout the various drawing figures, reference numeral 10 is directed to the custom rule system according to the present invention.

In its essence, and referring to FIG. 1, the custom rule system 10 can be apportioned to include three primary modules: a custom rules module 40, a display module 50, and a custom rule set database module 60. The custom rule system 10 can further include a fourth primary module: an information extraction module 80. These modules can be integral with one another in any combination or can exist separately. In addition, these modules can reside on a single computer or on a plurality of independent computers that interact via a network.

In one embodiment, the system 10 includes at least one computer that is comprised of a processor 20, a memory 22, an input 42 having a mouse 44 and a keyboard 46, an output 52 having a display 54, and a database 72. A system bus 82 operatively couples together the processor 20, the memory 22, the input 42, the output 52, and the database 72.

The processor 20 is capable of, inter alia, performing computing functions and executing software programs.

Memory 22 preferably includes a read only memory (ROM) 24, a read/write memory (R/WM) 26, popularly known as random access memory (RAM), and a storage memory 28. ROM 24 is a nonvolatile memory (memory that retains stored information even without power) that typically stores a basic input/output system (BIOS) that provides, inter alia, user-transparent I/O when the processor 20 is operating under an operating system 30. R/WM 26 is a volatile memory: memory that does not retain stored information without power. The storage memory 28 can include one or more hard disks, floppy disks, compact disks, cassette tapes, magnetic tapes, et cetera.

The operating system 30 is employed for orchestrating operation of the computer. The operating system 30 is typically stored in the R/WM 26 and on the storage memory 28 such as a hard disk and can include a shell 32. One or more application programs 34, such as the custom rules module 40 and display module 50 can be loaded (i.e., transferred from storage into memory) for execution by the system 10.

In turn, the output 52 cooperates with the operating system 30 and any application programs 34 for, inter alia, displaying application windows, graphical objects, icons, data from ids the R/WM 26, data from the storage memory 28, and data from the database 72 on the display 54 via the graphical user interface 48 and display module 50.

Typically, the graphical user interface 48 includes a desktop metaphor upon which one or more icons, application windows, or other graphical objects are displayed on the display 54. The mouse or other input device is utilized in conjunction with the graphical user interface 48 for controlling hardware components and software objects through the selection and manipulation of associated graphical objects displayed on the display 54.

Thus, the user employs the mouse 44 and/or keyboard 46 in conjunction with the graphical user interface 48 for inputting user commands and information including data such that the system 10 can operate on these inputs in accordance with instructions from the operating system 30 and any application programs 34 including the custom rules module 40 and the display module 50. The keyboard is typically utilized to enter characters, but may also be utilized to perform the mouse functions.

The graphical user interface 48 also serves to display the results of these operations. Although shown conceptually as separate modules, the operating system 30 and shell 32 may provide the graphical user interface 48 and the custom rules module 40 may provide the display module 50.

The custom rule set database module 60 resides on database 72 and includes a plurality of user created custom rules 62 that are individually stored therein. Custom rules 62 are comprised of a plurality of tables 62. The tables 62 include at least one rule step table that in turn, includes a plurality of step references or identifiers (IDs) that are each associated with at least one of a plurality of Rule Steps 100 stored within the database 72. The rule step table further includes one or more rule references or identifiers (IDs) such that all of the step identifiers that are associated with the same rule identifier define the individual Rule Steps 100 that form an individual, user created custom rule. A plurality of user created custom rules can be defined by a plurality of rule identifiers, each comprised of a plurality of individual Rule Steps 100 that are individually stored within the database 72. Additionally, interconnections between the individual Rule Steps 100 that form any individual, user created custom rule are also stored in one or more of the tables 62.

More specifically, the Rule Steps 100 stored in the database 72 can include both binary and unary rule steps that either load operands or process operations. Hence, Rule Steps 100 can be stored as operands and operations—not as text to be parsed. Additionally, Rule Steps 100 can have inputs and outputs.

Operand Rule Steps can include measurements, statuses, design values, hard coded functions, constants (numerical, Boolean or enumerated values), results from previously defined rules, user defined calculated values, and user defined calculated values. Operand Rule Steps load operand data.

Operation Rule Steps can be comprised of a multiplicity of operators such as mathematical operators, comparison operators, Boolean operators, and conditional logic operators. Mathematical operators may include addition (+), subtraction (−), multiplication (*), division (/), find maximum value (Max), find minimum value (Min), and find absolute value (Abs). Comparison operators may include an equal to operator (=), a not equal to operator (□), a less than operator (<), a less than of equal to operator (<=), a greater than operator (>), and a greater than of equal to operator (>=).

Boolean operators may include AND, OR and NOT operators. Conditional logic operators may include IF-THEN-ELSE statements (e.g., IF input_1 THEN input_2 ELSE input_3). Operation Rule Steps take the results of previous Rule Steps as inputs and the processing of an operation Rule Steps is independent of other Rule Steps.

The information extraction module 90 is operatively coupled to the processor 20 via the system bus 82. In its essence, the extraction module 90 extracts information from data acquisition devices 92 that collect data engendered from sensors 94 monitoring assets 96 including machinery. This information is processed according to; inter alia, user created custom rules for protecting and managing assets including machinery. For example, the extracted information can be passed to the processor 20 via the system bus 82. The processor 20, in turn, runs any active user created custom rule on the information for obtaining conclusions about the monitored assets including the severity of any problems. The conclusions and the severities are then written to the database 72. These conclusions and severities, along with perhaps conclusions from other systems and configuration information from other databases, are then sent to a message routing system and processed to determine who should receive what information in what time frame to appropriately respond to the situation as will be further explored infra.

Figure 2:
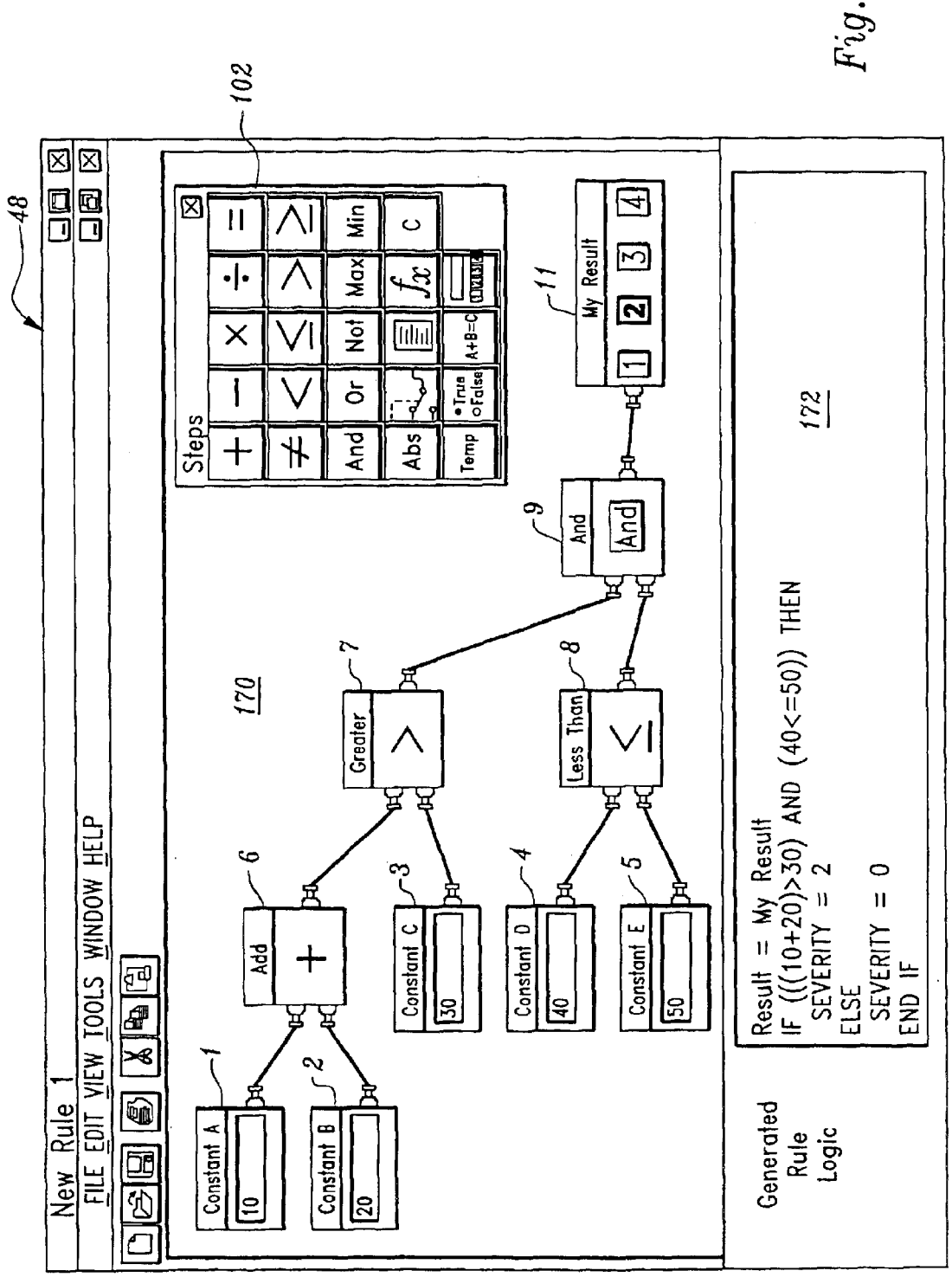
FIG. 2 is a screenshot view of a unified graphical user interface illustrating a custom rule interface view including a rule window view, a rule step table view and generated rule logic view according to the instant invention.

FIG. 2 illustrates an example of a custom rule created according to the present invention. The rule, as shown, carries out the expression "IF A+B>C and D<=E THEN My_Result." Rule Steps 1 through 5 are operand Rule Steps having constants (10, 20, 30, 40 and 50) as inputs for variables (A, B, C, D, and E), respectively. Rule Steps 6 through 8 are operation Rule Steps that respectively include an addition process operation step, a greater than process operation step, and a less than or equal to process operation step. Rule Step 9 is a Boolean AND process operation step. The last step is a result process operation step that generates a result that preferably includes a conclusion or event and a user predefined severity level.

In accordance with the present invention, an example of one method and order for generating this custom rule includes the following steps: utilizing the mouse 44 in conjunction with the graphical user interface 48 for first choosing a menu option "new rule" from a file menu; selecting and manipulating (dragging and dropping) graphical rule steps depictions (graphical depictions of the Rule Steps 100 stored in database 72) from a steps palette or steps matrix 102 to a separate rule window 170; entering constants, configuring any undefined result steps and interconnecting inputs and outputs of the Rule Steps 1 through 11. Note that the displayed palette or matrix defined by the present invention limits the user to only selecting valid Rule steps.

Figure 3:
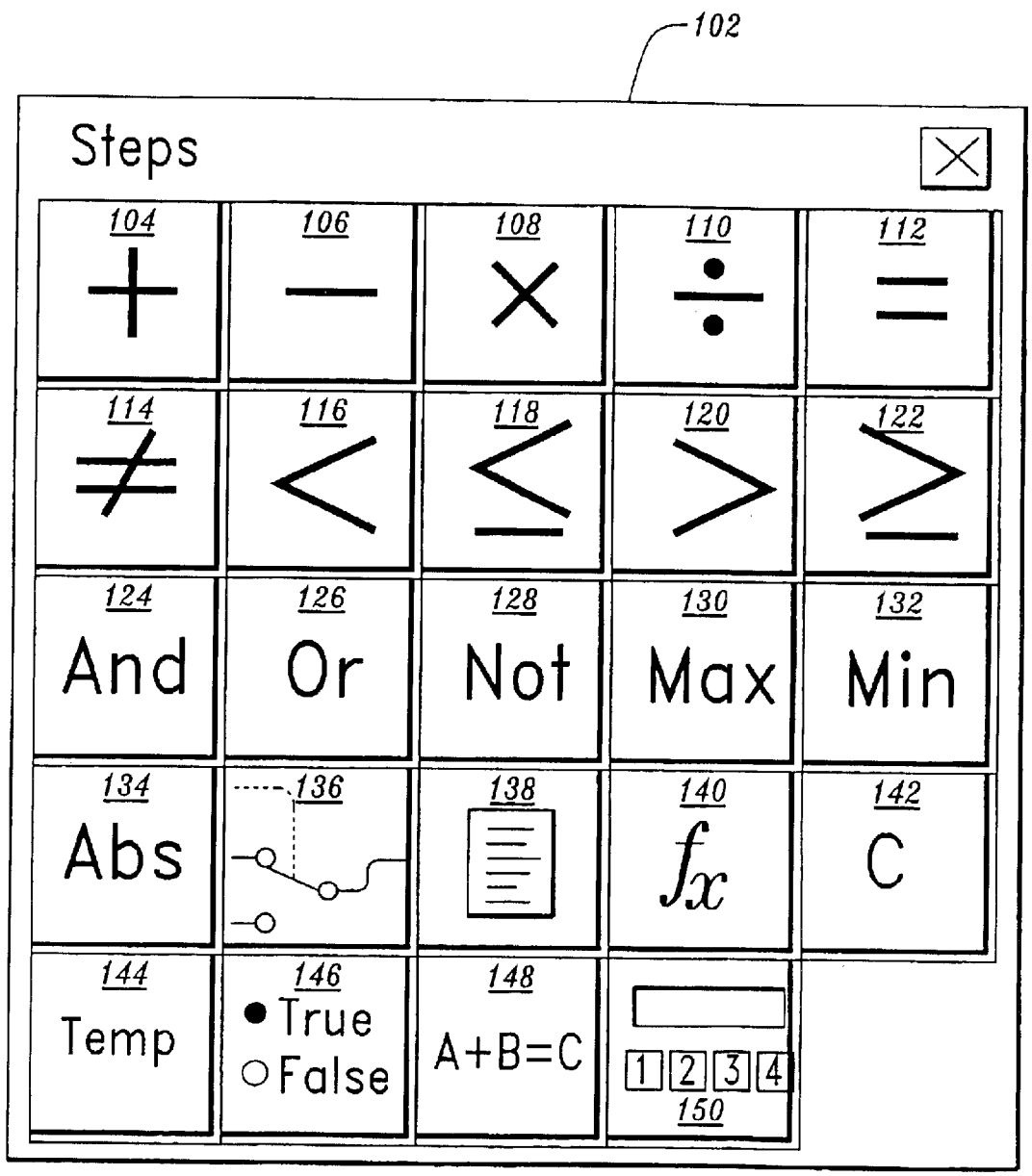
FIG. 3 is an expanded view of the rule step table view shown in FIG. 2 and according to the instant invention.

More Specifically, and still referring to FIG. 2 and to the expanded steps matrix 102 shown in FIG. 3, a constant Rule Step is employed for both Rule Steps 1 and 2. Thus, a constant rule step depiction 142 is consecutively dragged and dropped from the matrix 102 into a first columnar position as shown in FIG. 2. Rule Steps 3 through 5 are also comprised of the constant Rule Steps and the constant rule step depiction 142 is consecutively dragged and dropped from the matrix into a second columnar position as shown in FIG. 2. An addition Rule Step is employed for Rule Step 6 and its rule step depiction 104 is dragged and dropped from the matrix 102 into the second columnar position as shown in FIG. 2. A greater than Rule Step is employed for Rule Step 7 and its rule step depiction 120 is dragged and dropped from the matrix 102 into a third columnar position as shown in FIG. 2. A less than or equal to Rule Step is employed for Rule Step 8 and its rule step depiction 118 is dragged and dropped from the matrix into the third columnar position as shown in FIG. 2. A Boolean AND Rule Step is employed for Rule Step 9 and its rule step depiction 124 is dragged and dropped from the matrix into the fourth columnar position as shown in FIG. 2. A undefined result Rule Step is employed for rule step 11 and its rule step depiction 150 is dragged and dropped from the matrix into a fifth columnar position which concludes the selection of Rule Steps for this particular custom rule. The user then configures the conclusion and severity level of the undefined result Rule Step and gives values to the constants (A, B, C, D, & E) via, for example, entry by the keyboard and manipulation of the mouse. The Rule Steps are then interconnected by, for example, clicking and holding a button of the mouse on an output of one rule step and then dragging to an input of another rule step and releasing the button. This process is repeated until all of the individual outputs of each Rule Step are connected to individual inputs of other Rule Steps as shown. Each connection, from a rule step output to a rule step input, is stored in the database 72. The end in result of this process is a new custom rule that can also be stored in the database 72 and then actuated upon demand. Hence, the present invention allows custom rules to be created graphically and without writing a single line of code. In fact, the associated code that heretofore was required to create the custom rule of this example is shown in the rule logic graphical window 172.

The present invention stores rules as Rule Steps which make it possible to run rules very quickly. Since rules are not stored as text, but instead as executable Rule Steps, the system can preload all the Rule Steps 100 and when a custom rule is ran rule step processing: starts immediately. Alternatively, the system can load the Rule Steps 100 in the order defined by the custom rule thereafter processes the custom rule. The outputs from Rule Steps are stored in memory. Whenever a Rule Step has an input from a previous Rule Step that value is available in memory and can be retrieved quickly.

In one preferred form, the Rule Steps are processed from left to right and rule connections to the input of any step that is at the same columnar position or to the left of itself is not allowed thereby insuring that all step outputs have been calculated before they are needed by any other Rule Step. This also eliminates the possibility of infinite loops. Additionally, the present invention can preclude connection creation when the input/output types are incompatible or invalid as a result of being able to compare input/output types before allowing a connection to be made between any input and any output.

The present invention also allows loop type processing. For many Rule Steps the top (first level) input will be looped and compared with the bottom (second level) input. Multiple second input connections are allowed for several types of Rule Steps. All Rule Steps that allow multiple second level input connections preferably create the same output; regardless of which order the second level inputs are processed. An example is the addition (+) Rule Step. Five numbers can be added together by connecting the first number to its top input and then four more to its bottom input. The loop will then add the top number to one of the bottom inputs. The resulting value will be added to the next bottom input, until all of the bottom inputs have been added to the sum. The sum of all of the numbers will then be stored as the output from this step.

Figure 4:
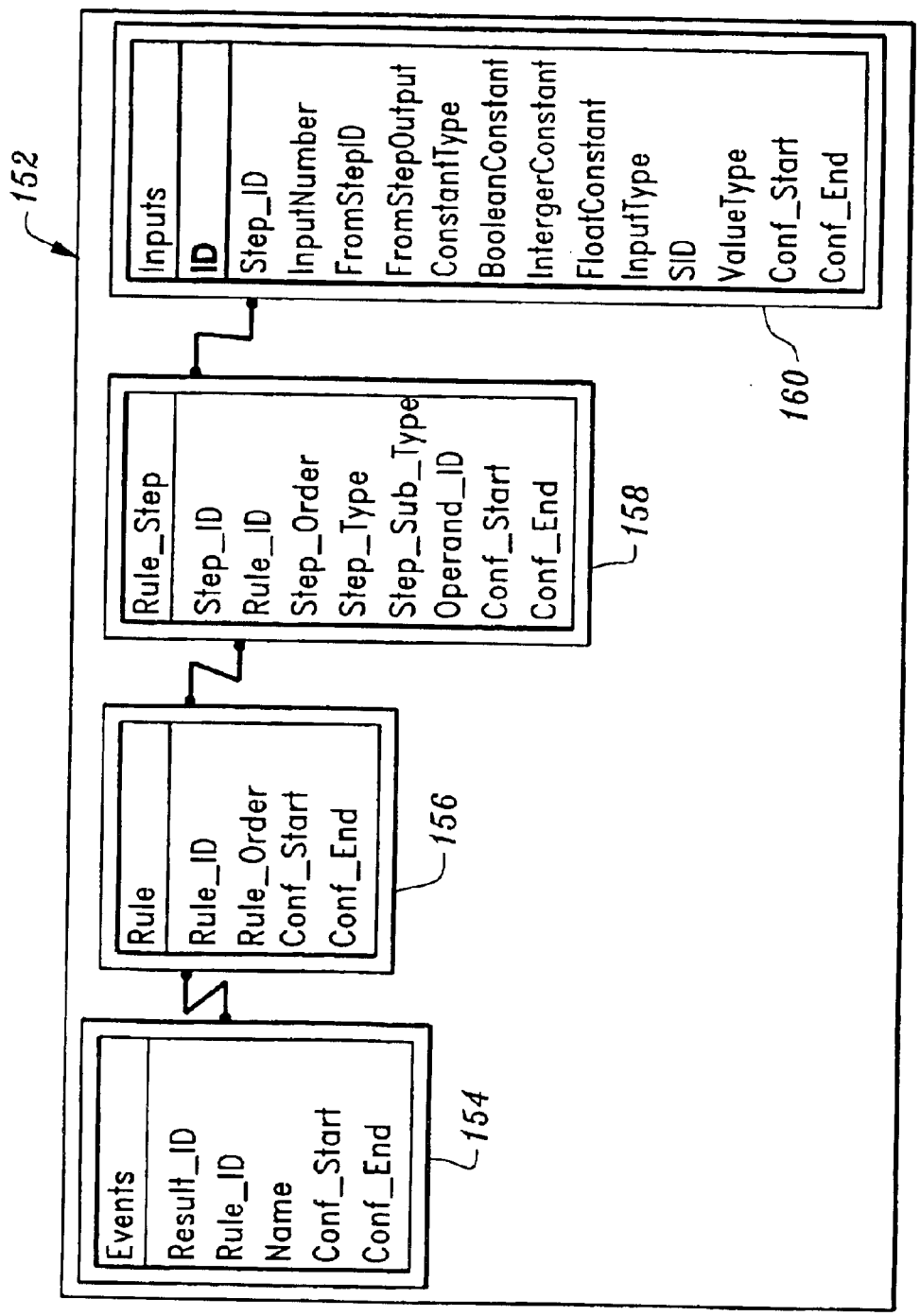
FIG. 4 illustrates a database schema according to the instant invention.
Figure 5:
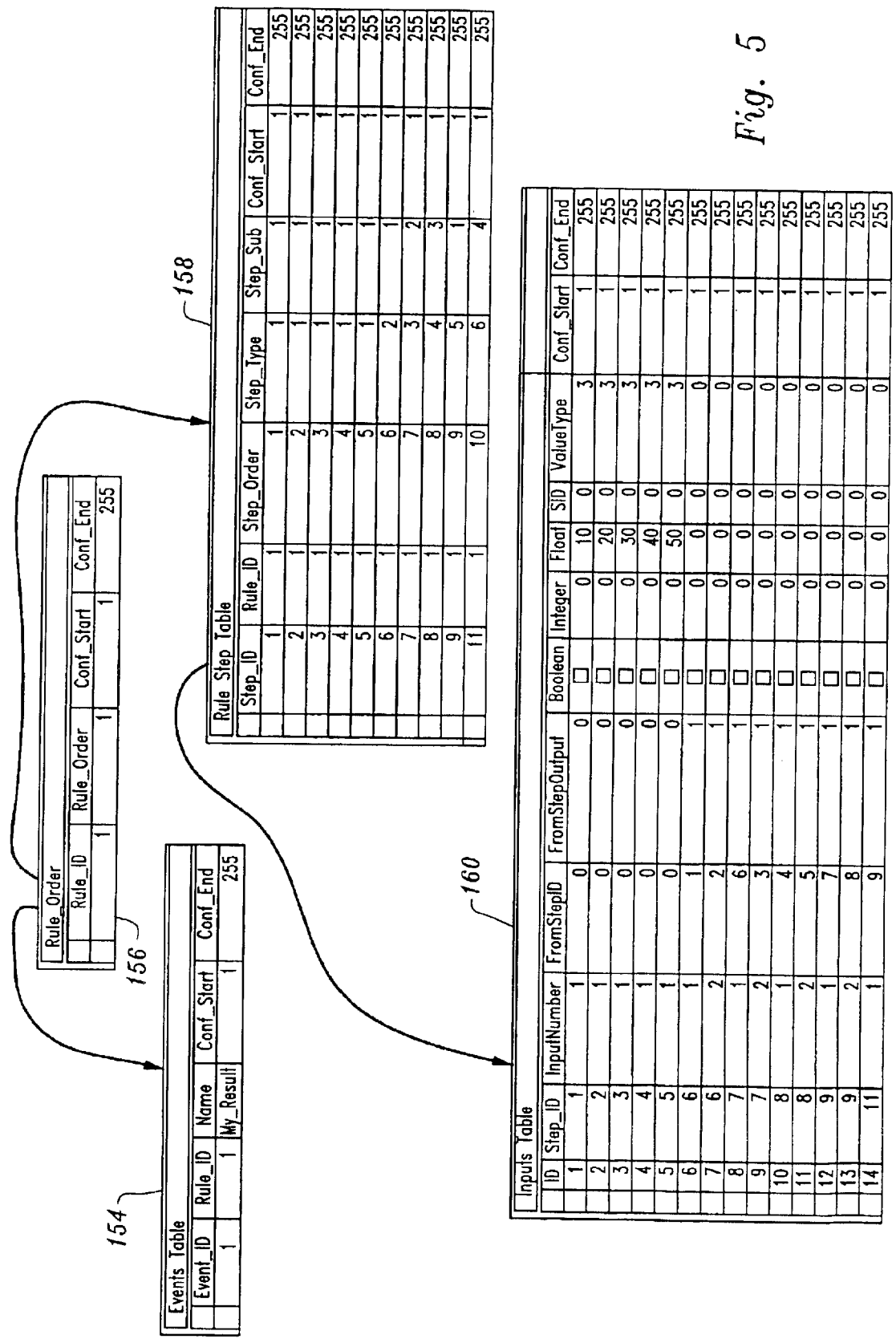
FIG. 5 illustrates tables associated with the database schema shown in FIG. 4 and according to the instant invention.

Turning to FIGS. 4 and 5 can complete the above illustrative example.

FIG. 4 illustrates a Database Schema 152 that shows how the custom rule set database 60 can be broken down into a series of logical steps instead of having a stream of text wherein every step has one or more inputs and a process. This database schema 152 is an example of tables 64 being comprised of four tables: an events table 154, a rule table 156, a rule_step table 158, and a inputs table 160. These tables are stored within the database 60 and each of these tables includes one or more records 66 having fields 68. Multiple records 66 can be included in each of these tables and each of the like multiple records within the same table typically include the same respective fields.

For example, every record in the rule table 156 may include four fields and there can be hundreds of records that correlate to hundreds of custom rules 62. Thus, the rule table 156 can include a multiplicity of records that in turn can each include a multiplicity of fields.

Every custom rule generates an event, which is a result and every rule is made up of one or more rule steps. For example, the fourth entry in the rule step table 158 is a step type which can be an operand step such as the constant steps shown in FIG. 2 or an operation step such as id 4 the addition step, the greater than step, the less than or equal to step, and the Boolean AND step also shown in FIG. 2. Each step has one or more inputs. In the case of the constant steps the step type would be an operand and the input would be a constant or a collected data value. In the case of operation steps, such as the addition step, the step type would be addition and inputs would be previous steps such as the constants or values generated in preceding steps.

FIG. 5 shows an example of the actual table entries stored for the custom rule illustrated in FIG. 2. Starting with the rule table 156; there is shown a single record stored therein. This record includes a rule ID having a value of one (1) and a Rule_Order or precedence having a value of one (1). The conf_start and conf_end fields are used to maintain all configurations for all time in the database and are further delineated infra.

Thus, the rule table 156 shows that there is a custom rule whose rule ID is one (1) and this associates over to the event table which shows that rule ID one generates a result called My_Result. The rule table also associates over to the rule step table 158 that shows that there are ten different Rule Steps that each has a rule ID of one (1). Hence, every entry in the rule step table that has a rule ID of one belongs to rule one. The step order happens to also follow the same order as the step ID. The first five step types (Step IDs 1 through 5) are all one (1) and for this example, the association is a call to go get or load data. Step ID 6 has a step type of two, which in this example, is the addition process. Step ID 7 has a step type of three, which in this example, is greater than process. Step ID 8 has a step type of four, which in this example, is less than or equal to process. Step ID 9 has a step type of five, which in this example, is a Boolean AND process. Finally, Step ID 1 has a step type of six, which in this example, is the result of the custom rule or the My_Result event.

The rule table also associates over to the inputs table 160 that shows multiple fields under a column heading called step ID. Starting with step ID one, the processor looks for all inputs for step ID one, which in this example, includes only one input identified by an input that requires data to be loaded. Thus, step 1 is to go get the value for A and load it into memory so that it is available. More specifically, the Step ID one in the input table correlates to the Step ID one in the rule table that has a step type of one that is correlated to going to get an operand.

Similarly, step IDs 2, 3, 4, and 5 each also includes only one input that requires data to be loaded. Thus, steps 2, 3, 4, and 5 are steps that go get the respective values of B, C, D, and E, load them into memory so that they are available. Thus, the operands in steps 1 through 5 are represented by variables (A, B, C, D and E) and the steps are getting the real values or data for these variables. In this case, the data for the A, B, C, D and E variables are constants that may be stored in the table under the heading called Float.

Alternatively, segment IDs (SIDS) in the input table may provide a representation that is used by the processor for orchestrating what data to go load and where to load it from for each of the A, B, C, D and E variables.

Step ID six has two inputs: order or input number 1 and order or input number 2. These inputs come from step output one of step ID one and step output one of step ID two as is shown under the respective column headings called "FromStepOutput" and "FromStepID." in this example, the respective outputs are from Rule Steps 1 and 2. Thus, the top or left input for step ID six comes from the output of Rule Step 1 and the bottom or right hand input comes from the output of Rule Step 2. Similarly, step ID seven has inputs that come from the outputs of Rule Steps 6 and 3, step ID eight has inputs that come from the outputs of Rule Steps 4 and 5, and step 1D nine has inputs that come from the outputs of Rule Steps 7 and 8. The output of Rule Step 9 is the input to Rule Step 11 and generates the result called My_Result. This illustrates how the steps are interconnected and how these interconnections are stored.

Referring back to the rule table 156, the fields under the Rule_Order or precedence heading allow a user to use an output of one: rule for an input to another rule. For example, a discharge stem high temperature event determined by one rule can be used in one or more other rules without having to rework the same logic a multiple of different times. Thus, this allows the system 10 to process a custom rule once, maintain that value and then reuse that value a multiple of different times.

However, the rule that determines that the stem temperature is high must be processed before the other rules are processed. Thus, there has to be precedence. As a result, the rules that have dependencies on them, the rules that have an output that gets used in a future rule have to be processed first. For example, if a first result is generated and used in a second rule and then a second result is generated and used in a third rule there is a chain of dependency so a precedence is placed on them. All rules that have to get run first get, for example, a one, and rules that run next get a two and so on. This defines what order the rules are ran so that the wrong information is not used.

Figure 6:
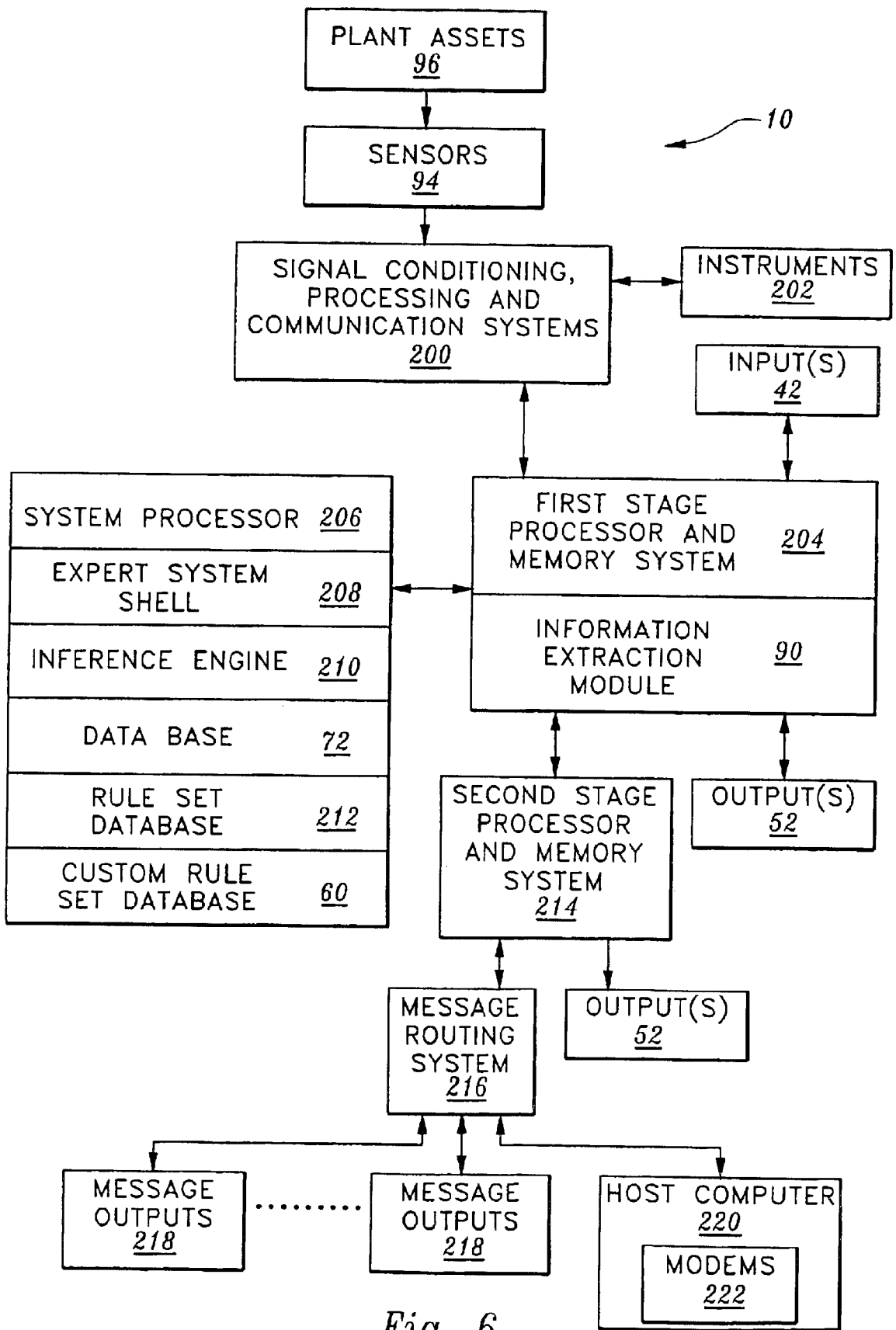
FIG. 6 is a schematic view of the custom rule system being employed with an asset management system for protecting and managing industrial plant assets including a multifarious grouping of machinery and processes.

Referring now to FIG. 6, and expanding on FIG. 1, the custom rule system 10 can be operatively coupled to a multiplicity of sensors 94 monitoring assets 96 of, for example, an industrial plant. In turn, a signal conditioning, processing and communication systems 200 is operatively coupled to the multiplicity of sensors 94, instruments 202 and to a first stage processor and memory system 204 that includes the information extraction module 90.

The signal conditioning, processing and communication systems 200 can be employed for the data acquisition devices 92 and can be comprised of the following: parallel devices including online continuous devices, wired and wireless scanning/sequential devices including online scanning or multiplexing devices, off-line diagnostic and surveillance devices including portable data collectors, condition monitoring devices such as oil analysis, and processes controllers and devices including process controllers.

The first stage processor and memory system 204 can be comprised of the processor 20, the memory 22, the input 42, the output 52, the database 72 including the custom rule set database 60 and Rule Steps 100, and to extraction module 90 via the system bus 82 as shown in FIG. 1. Additionally, the first stage processor and memory system 204 is operatively coupled to a systems processor 206, an expert system shell 208, an inference engine 210, a rule set database 212 and database 72. Note that the database 72 can be coupled to the first stage processor and memory system 204 and/or be integral formed with the first stage processor and memory system 204.

The signal conditioning, processing and communication systems 200 are used to receive raw data from the sensors and condition, process and communicate this data to the first stage processor and memory system 204. The first stage processor and memory system 204 processes and stores the communicated data. This information is then communicated, as it is asked for, to the information extraction module 90. The first stage processor and memory system 204 and the system processor 206 uses the information extracted by the information extracted module 90, in addition to any input from inputs 42 and from inference engine 210, and according to any activated rules from the custom rule set database 60 and rule set database 212 to obtain conclusions about the condition of the sensors 94, instruments 202, and assets 96 including machinery and processes.

The conclusions about the condition of the sensors, instruments, machinery and processes and the severity of any problems associated therewith (along with conclusions from other systems and configuration information from other data bases) can be sent to output(s) 52 and/or to the message routing system 216 via a second stage processor and memory system 214 such that the information is processed to determine who should receive what information in what time frame to appropriately respond to the situation. More particularly, the conclusions and severities drawn from the processed parameters are sent to the second stage processor and memory system 214 and then to the message routing system 90 that is customizable to route the specific conclusions to respective personnel via outputs 218 or to a host computer 220 via modems 222, which in turn can store and/or route the specific conclusions to respective personnel.

More specifically, and still referring to FIG. 6, the system 10 can include the expert system shell 208 having an object-oriented paradigm. The present invention uses this shell 208 in cooperation with either processor 204 or 206 to build a framework of a class hierarchical knowledge base that can reside in database 72. A general description of the attributes or properties of each asset in a plant to be managed and a rule set and/or a custom rule set for operating on these attributes are defined into classes that reside at the top of the hierarchical knowledge base. The next level down in the hierarchical knowledge base allows sub-classes to in be appended to the hierarchical classes. Thus, a more specific description of the attributes of each asset in a plant and the methodology for operating on these attributes may be defined into sub-classes which inherit everything in the upper class from which they depend.

For example, an upper class may be defined generally as pump and a sub-class may be created called a water pump that depends therefrom. Thus, the sub-class called water pump inherits the defined attributes and methods defined in the hierarchical class called pumps. Thus, a specific type of water pump may be appended to the upper level of the hierarchy and would inherit and reuse everything contained within the hierarchical class called pump. In addition, the sub-class may be defined to add, delete or redefine the attributes and rule sets in the upper class called pumps.

Once the upper classes have been defined the specific assets in a specific plant may be configured as objects. In one form, the attributes and rule sets of these objects are written into the first stage processor and memory system 204 and piped over to the expert system shell via a bridge and are instantiated into objects to be processed by an object-oriented paradigm of the expert system shell 208.

Objects can be appended into the system 10 by using input 42 or storage memory 28 which may include configuration input and knowledge input. The knowledge input may include storage media, which works with storage memory 28, on which proprietary attributes and methodology of a specific type of asset have been stored. The first stage processor and memory system 204 simply reads the information off the modules and pipes the information over to the system processor 206 and shell 208 where it is instantiated into objects which represent the specific asset. This process can be accomplished without any trade secrets contained in the storage media being disclosed. Input(s) 42 can be used to directly insert configuration information and any other necessary information regarding assets to be managed. This information is handled in the same way as the information contained on the storage media.

Thus, each time an audit is to be performed a set of raw data is obtained from the sensors 94 representative of the conditions of the assets within, for example, a machine train for providing a snapshot in time of what is occurring in the machine train. The first stage processor and memory system 204 and/or the system processor 206 process these parameters. The information extraction module 90 then extracts information from these parameters and the first stage processor and memory system 204 and/or the system processor 206 process this extracted information according to rules in the custom rule set database 60 and/or according to rules in the rule set database 212. Thus, the rule sets and custom rule sets can combine and integrate the information assembled by the Database.

The conclusions drawn from the processed parameters are then sent to the second stage processor and memory system 214 and then to the message routing system 216 that is customizable to route the specific conclusions to respective personnel or to a host computer 220 via modems 222, which in turn can store and/or route the specific conclusions to respective personnel.

More specifically, the second stage processor and memory system 214 of the system 10 outputs a plurality of signals to the message routing system 216 which determines where to 31 output a message correlative to an actionable demand by the assets 96. Preferably, a severity level signal, a fault category signal and an asset with problem signal are associated with the output to the message routing system 216. The severity level may be defined as zero severity, one severity, two severity, there severity, et cetera. The fault category output may contain information on sensors, machinery, instruments, and processes. The asset with problem output may contain the information on the specific asset, for example a turbine having a steam problem.

The routing system 216 then determines where the message should be routed. For example, the message may be routed to one or more of the following: operators, machinery maintenance people, instrument and control system people, plant management people, sensor and instrument suppliers and machinery suppliers. For example, if the asset is a machine and the severity level is one the machinery maintenance department would receive an advisory. If the asset was an instrument and the severity level was one the instrument and control departments would receive an advisory. If a process had a level one severity the operator and an outside contractor would receive an advisory.

In use and operation, a user interacts with the custom rule system 10 by utilizing the mouse in conjunction with the graphical user interface 48 for creating custom rules. For example, if the user wanted to create a rule that detects a "steam problem" the process can be as follows.

Figure 7:
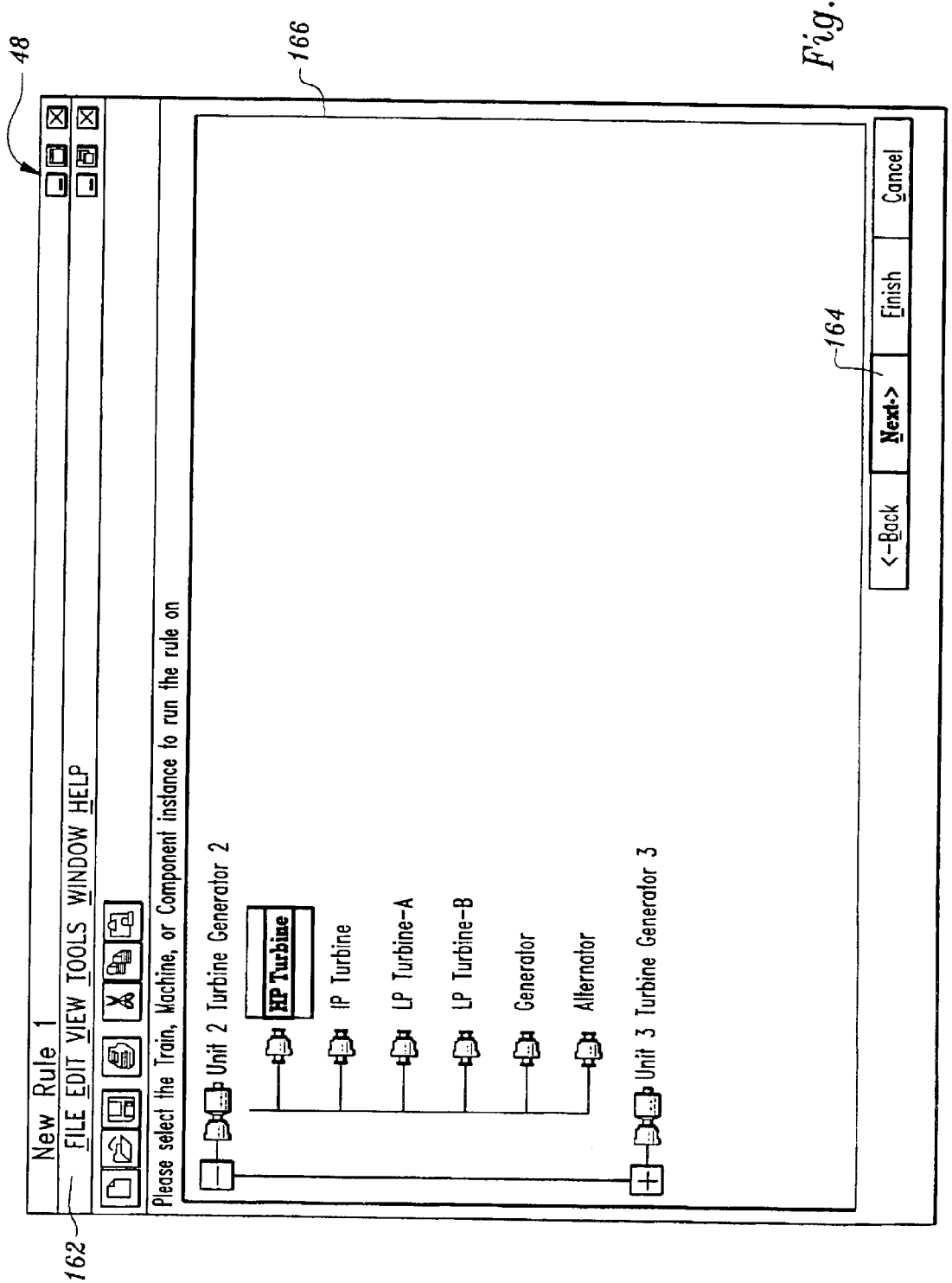
FIG. 7 a screenshot view of a unified graphical user interface illustrating a custom rule interface view including a dialog box having a hierarchical tree view from which a train, machine, or component for which a custom rule is to be created according to the instant invention.
Figure 8:
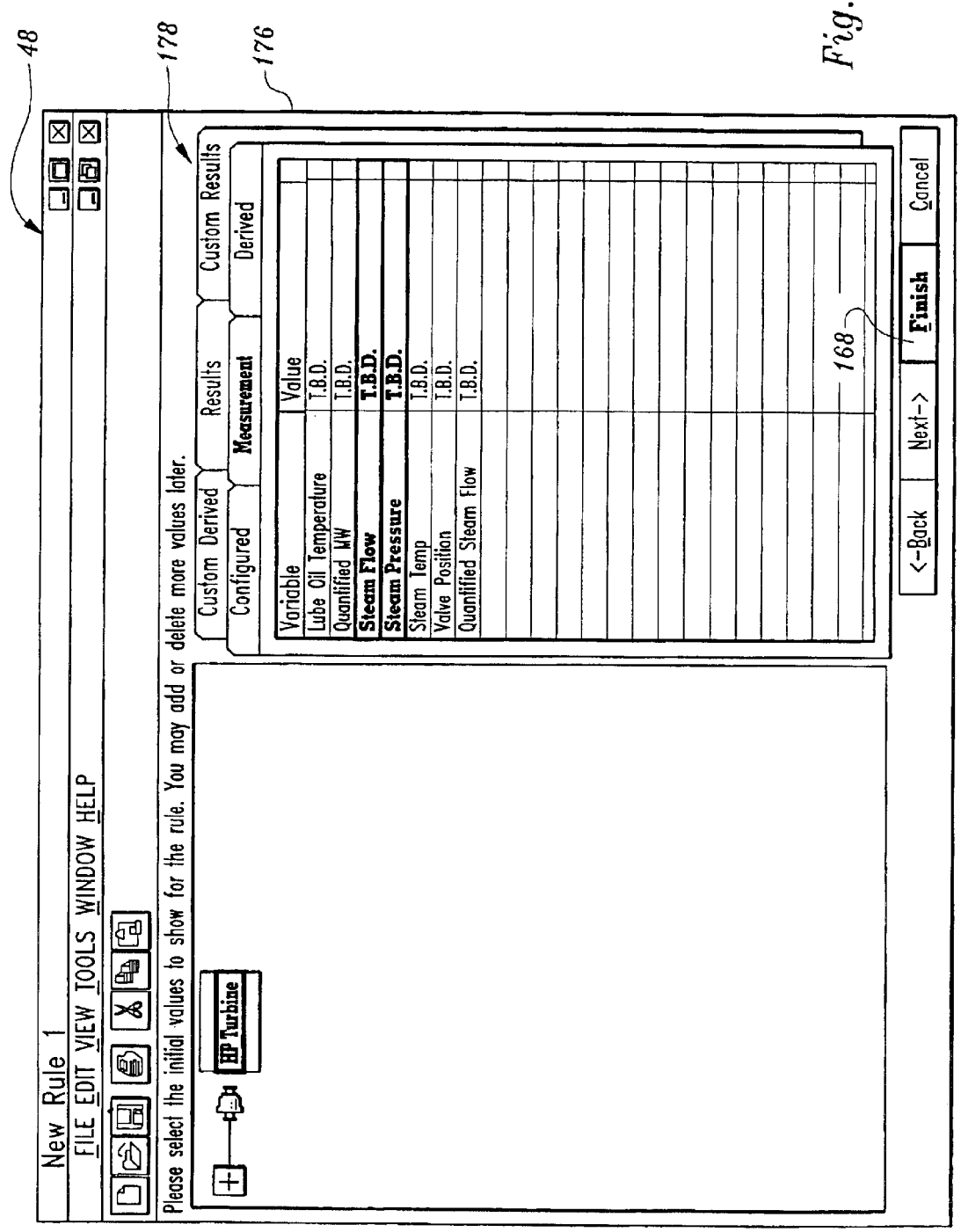
FIG. 8 a screenshot view of the unified graphical user interface illustrating a custom rule interface view including a dialog box having the selected train, machine, or component shown therein and a dialog having a plurality of categories from which to choose initial values to show for the custom rule that is being created according to the instant invention.

First, and referring to FIG. 7, the user would choose the menu option "new rule" from the file menu 162 and name that rule (e.g., new rule 1). The custom rule system 10 can then prompt the user to choose between creating a rule that would create a new custom rule or derived results by displaying on the GUI the following selections: Totally Custom Rules, Change Stored Rules and Derived Values. The user would then make a selection and subsequently click on a "next" icon 164 to move to the next dialog box. This next dialogue box 166, as shown in FIG. 7, would then display graphical objects of machine trains, machines or components to run the rule on. The user can then be prompted to select one or more of the graphical objects. The user would then utilize the mouse to select one or more of the graphical objects and would subsequently click on the "next" icon 164 to move to the next dialog box 176, which is shown in FIG. 8. Note that in this example the HP Turbine has been selected.

Figure 9:
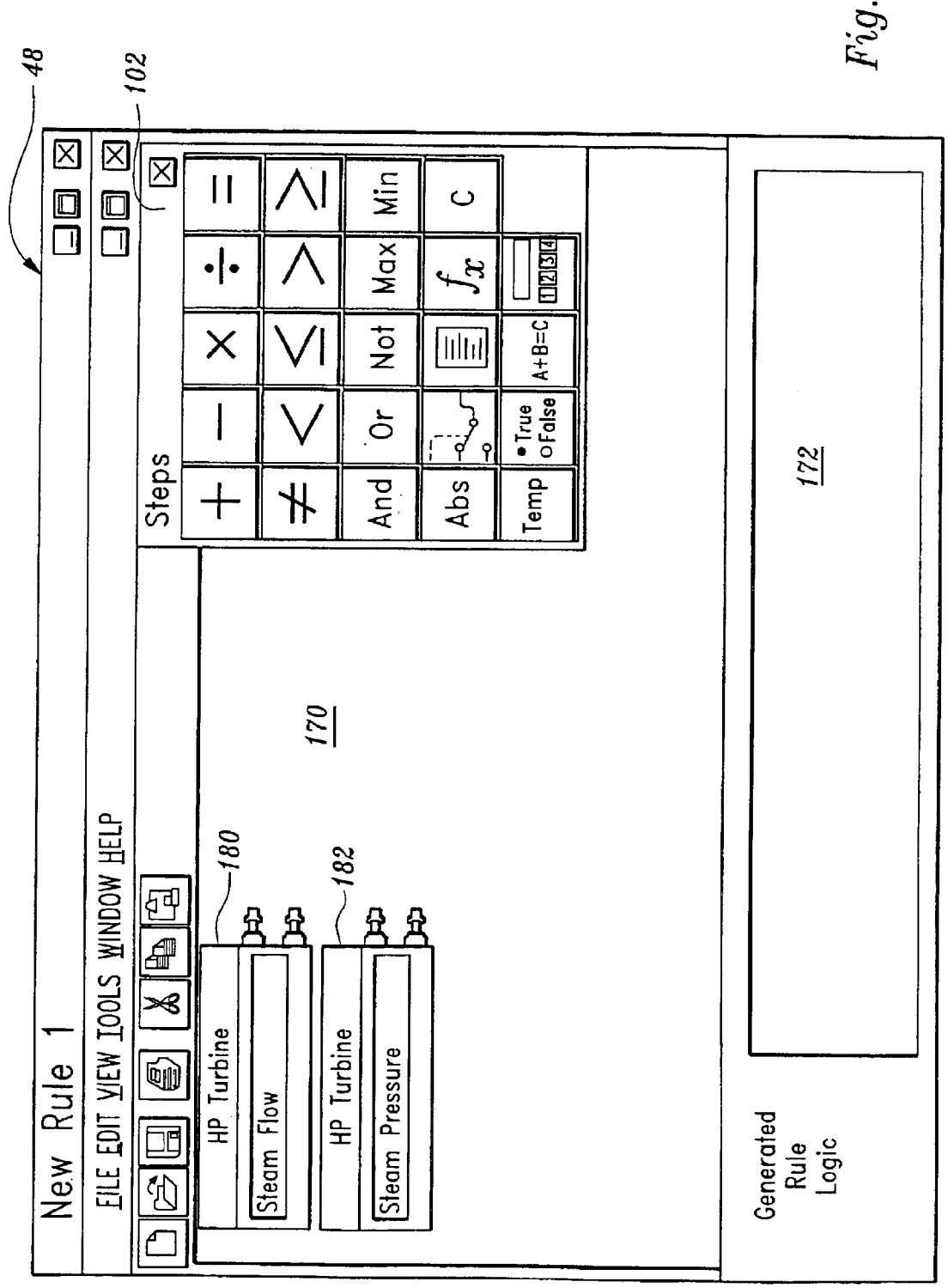
FIG. 9 is a screenshot view of the unified graphical user interface illustrating a custom rule interface view including a rule window view, initial rule steps, a rule step table view and generated rule logic view according to the instant invention.

Referring now to the dialog box 176 shown in FIG. 8, the user would then be prompted to select the initial values to show for the rule. The custom rule system 10 would provide information from the database or knowledge database 72 and display it to the user in a variety of classifications 178. The user would then select a particular classification from the different classification 178 for the selected machine. The classification may include raw data from transducers, processed data, or data from the database. For example, the classification can include configured data, measurement data, derived data, custom derived data, result data, and custom result data. The user would then select one or more items from the selected classification. For example, and as shown, the measurement classification has been selected and the user would then add measurements for the custom rule by selecting, for example the steam flow and steam pressure variables from the measurement classification thereby defining one step that is steam flow step 180 and one step that is steam pressure step 182 which are shown in FIG. 9. Subsequently the user would click on the "finish" icon 168 which would result in the custom rules module and display module bringing up the rules graphical window 170, the step pallet or matrix window 102, and the generated rule logic graphical window 172 as shown in FIG. 9.

Referring to FIG. 9, the user preferably utilizes the mouse 44 for selecting, dragging and dropping the Rule Step depictions from the step pallet or matrix 102 to the rules window 170 for defining the additional Rule Steps that are to be utilized in the "New Rule 1" custom rule.

Figure 10:
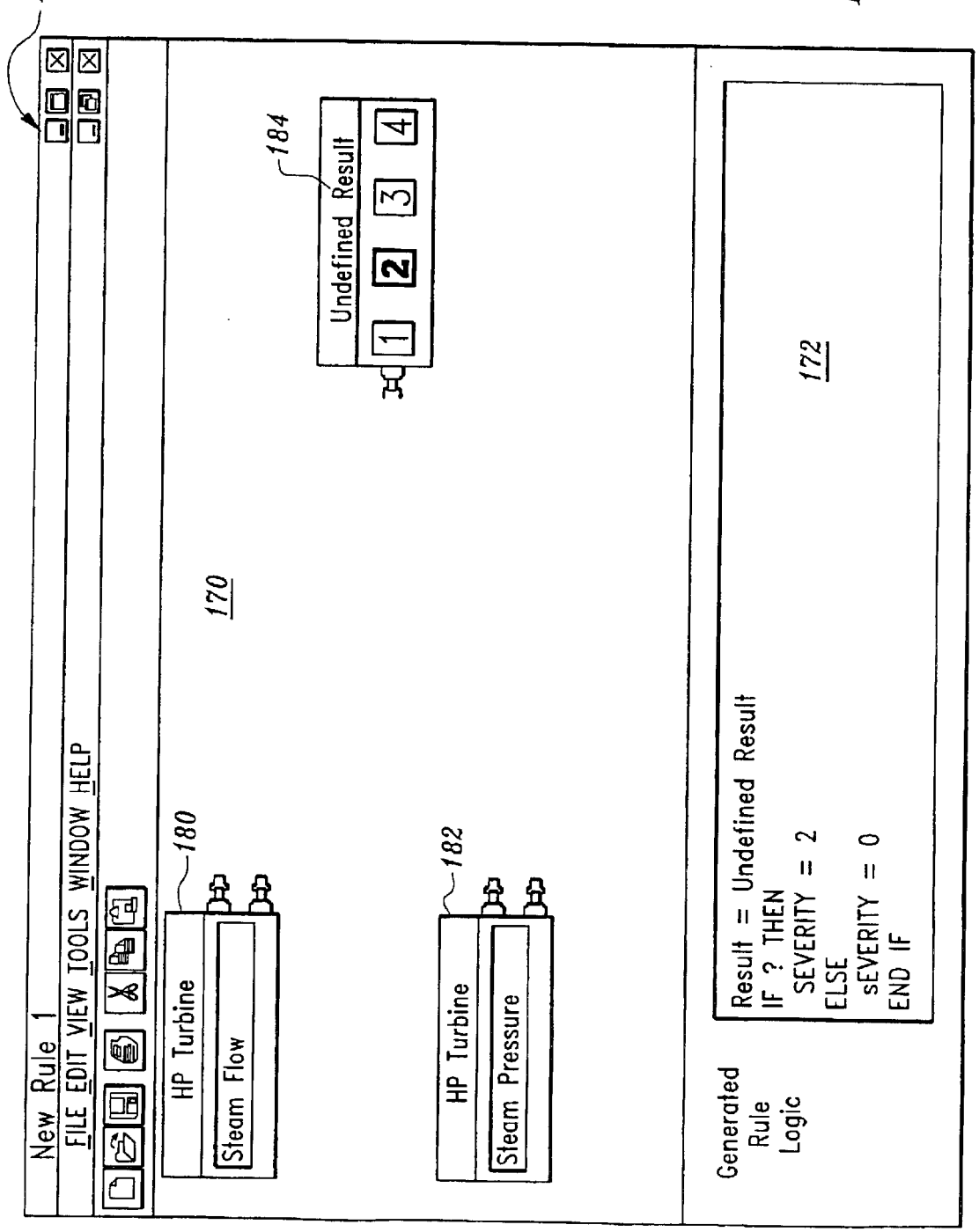
FIG. 10 is the screenshot view as shown in FIG. 9 with the rule step table view not shown for clarity and including an addition to the rule window view of a of a undefined, result step and its corresponding logic shown in the generated rule logic view according to the instant invention.

More specifically, and referring to FIGS. 9 and 10, the user can select, drag and drop the undefined result Rule Step depiction 150 from the palette into the rules window 170 where it is shown as Rule Step 184. Note that with this action a text version of the result step is disposed on the lower rule logic graphical window and includes a severity equal to two.

Figure 11:
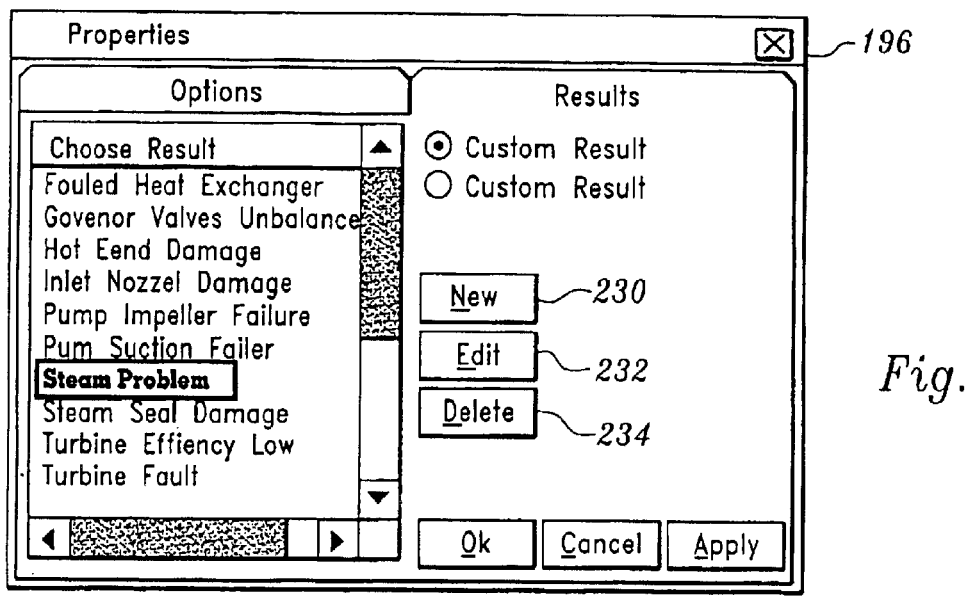
FIG. 11 is a view of a properties dialog box that is displayed on the unified graphical user interface when defining property parameters for the undefined result step shown in FIG. 10.
Figure 12:
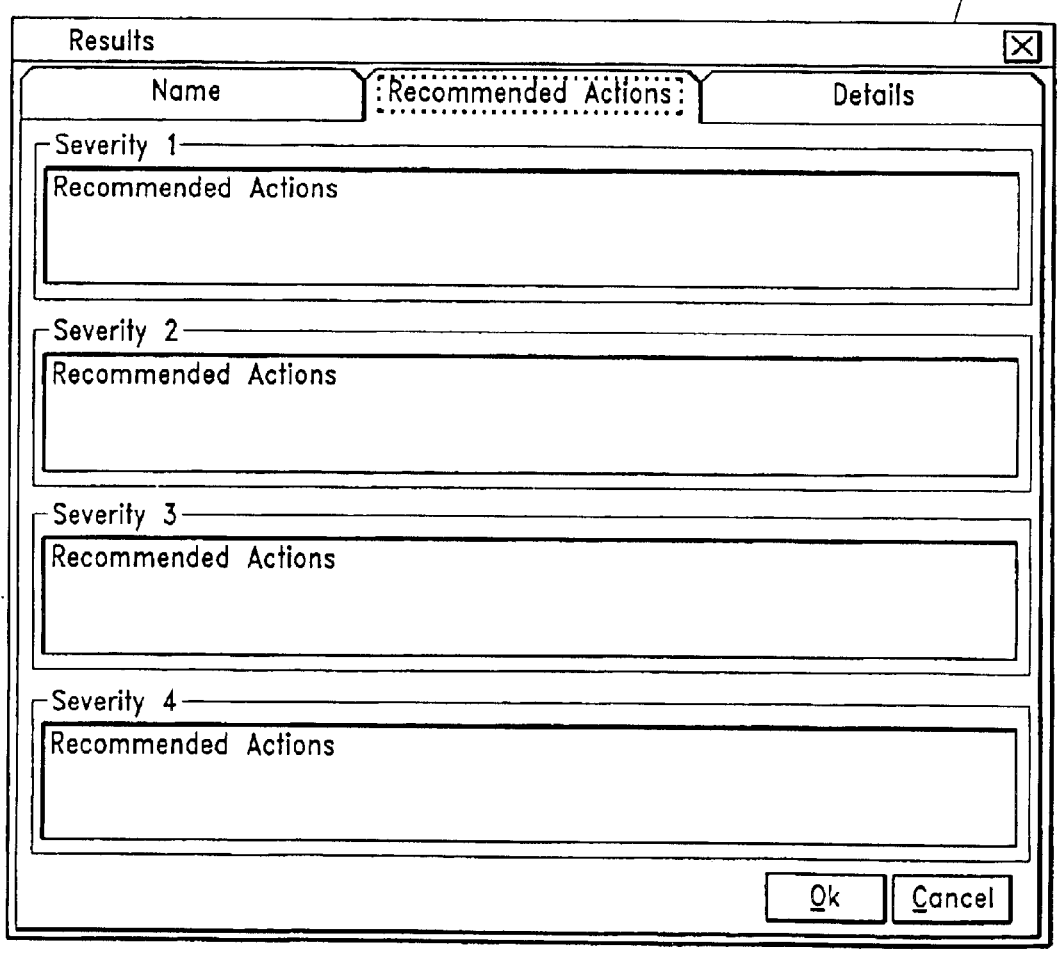
FIG. 12 is a view of a results dialog box that is displayed on the unified graphical user interface when defining result parameters for the undefined result step shown in FIG. 10.

Clicking a button on the mouse 44, for example, clicking a right mouse button on the undefined result Rule Step 184 results in the custom rules and display modules bringing up a properties dialog box 196 and a result dialog box 198 as shown in FIGS. 11 and 12, respectively. The properties dialog box 196 allows the user to select a result that gets created, and in this example, that result has been named "steam problem." Additionally, the properties dialog box 196 allows the user to select between creating a new result, editing an existing result or deleting an existing result via a new graphical key 230, an edit graphical key 232 and a delete graphical key 234, respectively. When any of these graphical keys are actuated the result dialog box 198 appears as shown in FIG. 12. The user can then add, edit and/or delete the name, recommended actions and details of the created result.

Figure 13:
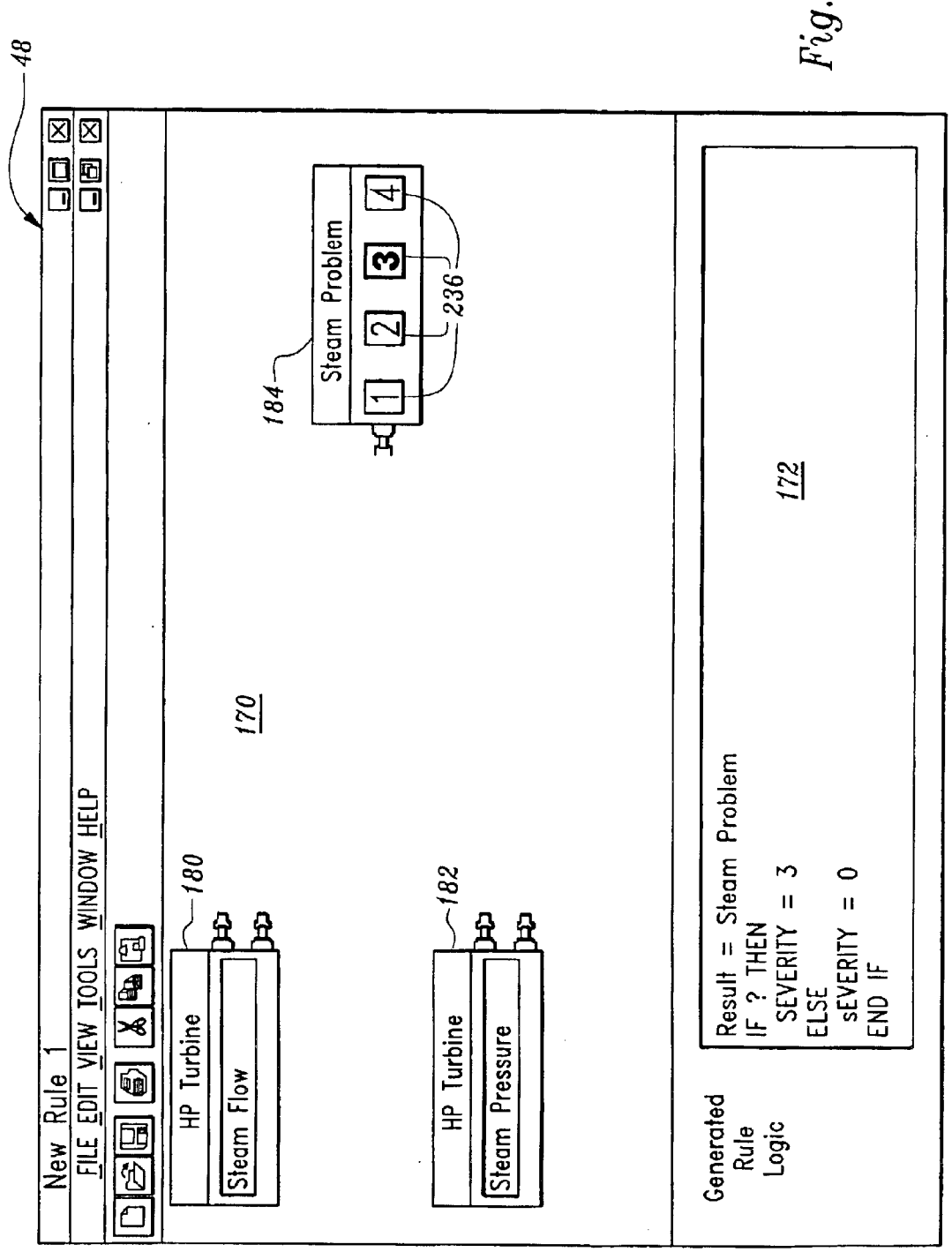
FIG. 13 is the screenshot view as shown in FIG. 10 with the undefined result step having been defined as a steam problem result, the severity level having been changed from two to three and corresponding logic shown in the generated rule logic view according to the instant invention.

Additionally, and referring to FIG. 13, the user can change the severity of the result by simply utilizing the mouse for clicking on any of severity boxes 236. In this example, the severity has been changed from severity two (2), as shown in FIG. 10, to severity three (3). This can also be seen from the text version disposed on the lower rule logic graphical window 172.

Additional rule steps are then added now that the result step has been added and defined.

Figure 14:
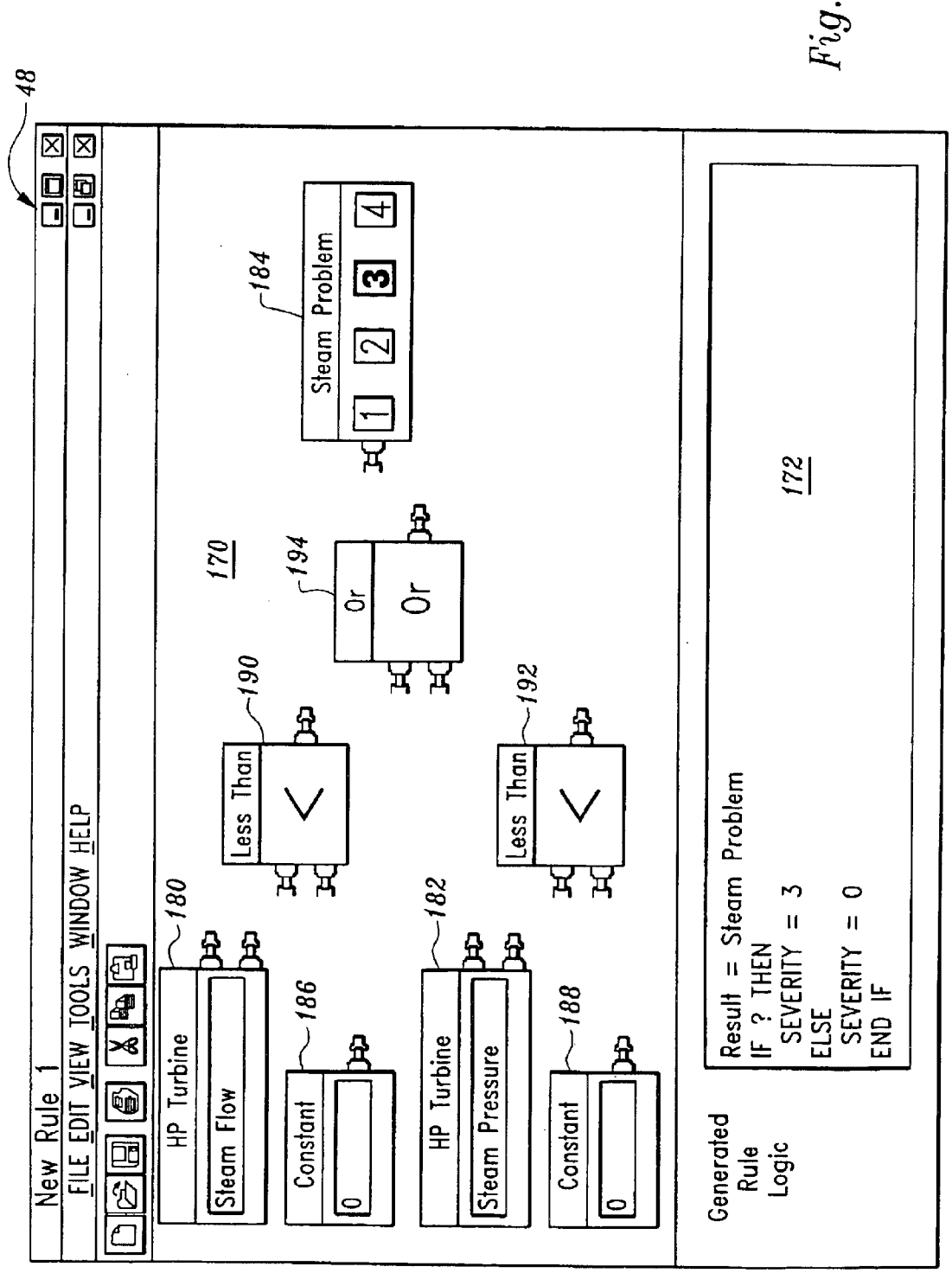
FIG. 14 is the screenshot view as shown in FIG. 13 including additional rules steps having been added to the rule window view.

Referring to FIG. 14, the user adds two constant Rule Steps 186, 188, two less than Rule Steps 190, 192, and a Boolean OR Rule Step 194. Note that palette 102 would also appear on graphical user interface 48 as shown in FIGS. 3 and 9, but has been removed for clarity.

More specifically, and as shown in FIGS. 3, 9 and 14, the user selects a first constant Rule Step depiction 142 from palette 102 and drags and drops it below the steam flow Rule Step 180 to form Rule Step 186 and then, the user selects a second constant Rule Step depiction 142 from palette 102 and drags and drops it below the steam pressure Rule Step 182 to form Rule Step 188 such that these four Rule Steps 180, 182, 186, 188 lie substantially within a first columnar position as shown in FIG. 14. Similarly, the user selects, drags and drops a first less than Rule Step depiction 116 into the rule window to form Rule Step 190 and then, the user selects, drags and drops a second less than Rule Step depiction 116 from the palette into the rule window to form Rule Step 192 such that the first and second less than Rule Steps 190, 192 lie substantially within a second columnar position which is to the right of the first columnar position. Finally, the user selects, drags and drops a Boolean Or Rule Step depiction 126 from the palette into the rule window to form Rule Step 194 such that the Or Rule Step 194 lies substantially within a third columnar position which is to the right of the second columnar position and to the left a fifth columnar position in which the result Rule Step 184 is disposed.

Once all of the Rule Steps are in place within the rules window 170, all that is left to do is input values for the constants and connect all the steps to finish the custom rule.

Figure 15:
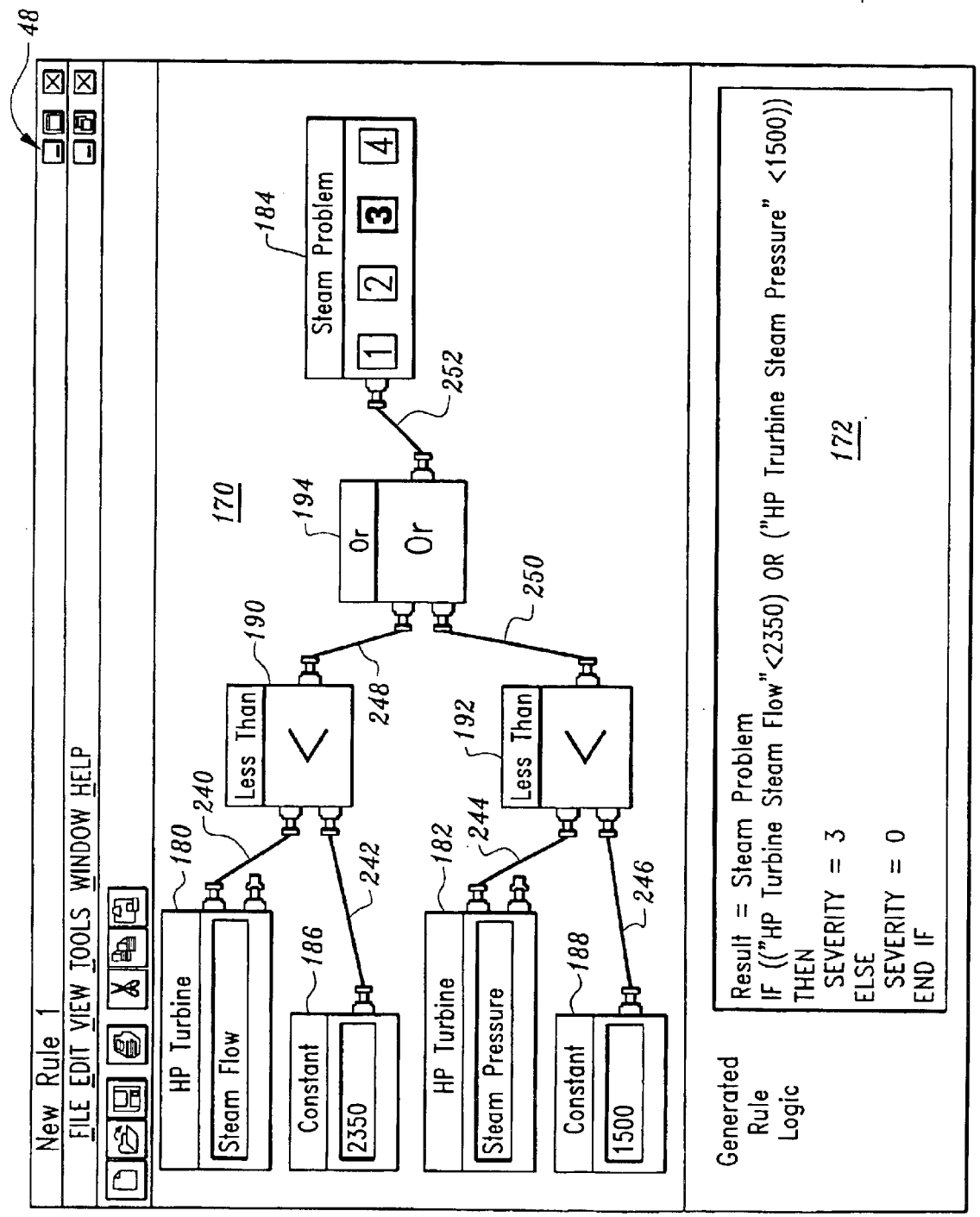
FIG. 15 is the screenshot view as shown in FIG. 14 including all of the rule steps being interconnected thereby completing the creations of a custom rule and having the completed rule logic shown textually in the generated rule logic view according to the instant invention.

Referring to FIG. 15, the user merely clicks a mouse button onto an output of one rule and drags and then lets go of the mouse button on an input of another rule that is disposed in a column to its right. This process is continued until the connections 240, 242, 244, 246, 248, 250, and 252 are obtained as shown in FIG. 15. This completed custom rule is then stored as function of, inter alia, rule steps identifiers and connections as illustrated and explained hereinabove and with reference to FIGS. 2 through 5. Note that the text in the generated rule logic window 172 is automatically updated as the rule is created and shows the completed custom rule text logic of the custom rule when all of the rule interconnections are completed.

Preferably, Rules Steps cannot be connected to Rules Steps that are to the left of them, in other words rule step connections can only go one way. Every rule step is totally autonomous, and each rule step is processed before each subsequent rule step.

Additionally, as a custom rule is created the custom rules module checks to see if connections are valid, if invalid the module will not create a connection. The module is programmed to know what can and cannot be connected by comparing input and output type. In contrast when code is written there is nothing to warn the user if interconnection are improper.

Upon completion and when the custom rule fires, an actual result will be shown to the user. Custom rule results can also generate sub-results values that do not fire events. Additionally, a single rule can fire multiple events of varying severity. Furthermore, logic paths can be shared between event triggers.

The user can create a wide variety of custom rules from the graphically displayed step pallet or matrix 102 as has been delineated supra. In one preferred form of the present invention, and referring back to FIGS. 1 and 3, the Rule Steps 100 which are graphically depicted: in the step pallet or matrix 102 are as follows:

Addition Rule Step depicted by 104 sums numbers or data together. When the addition rule step depiction is placed in the rules window its graphical depiction includes an output on its right side and a top left side input preferably capable of handling only one connection and a bottom left side input preferable capable of handling multiple connections. All inputs from the top and bottom left side inputs are added together irrespective of order and a result is outputted at the right side output.

Subtraction Rule Step depicted by 106 subtracts numbers or data. When the subtraction rule step is placed in the rules window its graphical depiction includes an output on its right side and a top left side input preferably capable of handling only one connection and a bottom left side input preferable capable of handling multiple connections. The top number is the first number used at the beginning of the subtraction process such that one bottom number is initially subtracted from the top number thereby obtaining a result from which a subsequent bottom number is subtracted from to obtain a subsequent resultant and so on until there are no more bottom numbers to be subtracted. The final result is outputted at the right side output.

Multiplication Rule Step depicted by 108 multiplies numbers or data. When the multiplication rule step is placed in the rules window its graphical depiction includes an output on its right side and a top left side input preferably capable of handling only one connection and a bottom left side input preferable capable of handling multiple connections. All inputs from the top and bottom left side inputs are multiplied together irrespective of order and the final is outputted at the right side output.

Division Rule Step depicted by 110 divides numbers or data. When the division rule step is placed in the rules window its graphical depiction includes an output on its right side and a top left side input preferably capable of handling only one connection and a bottom left side input preferable capable of handling multiple connections. The top number is the first number used at the beginning of the division process such that at first any bottom number is initially divided into the top number thereby obtaining a quotient from which a subsequent division is performed to obtain a subsequent quotient and so on until there are no more bottom numbers to be divided into the last subsequent quotient. The final result is outputted at the right side output.

Equal Rule Step depicted by 112 functions as a comparison step. When the equal rule step is placed in the rules window its graphical depiction includes an output on its right side and a top left side input preferably capable of handling only one connection and a bottom left side input preferable capable of handling multiple connections. The top value is compared with each of the bottom values and each of the bottoms values must be equal to the top value for an equal condition to hold true. A true or false final value in the form of for example, a one for true and a zero for false, is outputted at the right side output.

Not Equal Rule Step depicted by 114 also functions as a comparison step: When the not equal rule step is placed in the rules window its graphical depiction includes an output on its right side and a top left side input preferably capable of handling only one connection, and a bottom left side input preferable capable of handling multiple connections. The top value is compared with each of the bottom values and each of the bottoms values must be unequal to the top value for an unequal or not equal condition to hold true. A true or false final value: in the form of for example, a one for true and a zero for false, is outputted at the right side output.

Less Than Rule Step depicted by 116 also functions as a comparison step: When the Less Than rule step is placed in the rules window its graphical depiction includes an output on its right side and a top left side input preferably capable of handling only one connection and a bottom left side input preferable capable of handling multiple connections. The top value is compared with each of the bottom values and each of the bottoms values must be less than the top value for a less than condition to hold true. A true or false final value in the form of for example, a one for true and a zero for false, is outputted at the right side output.

Less Than Or Equal To Rule Step depicted by 118 also functions as a comparison step. When the Less Than Or Equal To rule step is placed in the rules window its graphical depiction includes an output on its right side and a top left side input preferably capable of handling only one connection and a bottom left side input preferable capable of handling multiple connections. The top value is compared with each of the bottom values and each of the bottoms items must be less than or equal to the top value for a less than or equal condition to hold true. A true or false final value in the form of for example, a one for true and a zero for false, is outputted at the right side output.

Greater Than Rule Step depicted by 120 also functions as a comparison step. When the Greater Than rule step is placed in the rules window its graphical depiction includes an output on its right side and a top left side input preferably capable of handling only one connection and a bottom left side input preferable capable of handling multiple connections. The top value is compared with each of the bottom values and each of the bottom values must be less than the top value for greater than condition to hold true. A true or false final value in the form: of for example, a one for true and a zero for false, is outputted at the right side output.

Greater Than Or Equal To Rule Step depicted by 122 also functions as a comparison step. When the Greater Than Or Equal To rule step is placed in the rules window its graphical depiction includes an output on its right side and a top left side input preferably capable of handling only one connection and a bottom left side input preferable capable of handling multiple connections. The top value is compared with each of the bottom value and each of the bottom value must be less than or equal to the top value for greater than or equal to condition to hold true. A true or false final value in the form of for example, a one for true and a zero for false, is outputted at the right side output.

Boolean AND Rule Step depicted by 124 functions as a logic step. When the Boolean AND rule step is placed in the rules window its graphical depiction includes an output on its right side and a top left side input preferably capable of handling only one connection and a bottom left side input preferable capable of handling multiple connections. All inputs must meet a certain condition, must be true or must have the same value for an AND condition to hold true. A true or false final value in the form of for example, a logic one for an AND condition that holds true and a logic zero for an AND condition that holds false, is outputted at the right side output.

Boolean OR Rule Step depicted by 126 also functions as a logic step. When the Boolean OR rule step is placed in the rules window its graphical depiction includes an output on its right side and a top left side input preferably capable of handling only one connection and a bottom left side input preferable capable of handling multiple connections. Any input must meet a certain condition or must be true for an OR condition to hold true. A true or false final value in the form of for example, a logic one for an OR condition that holds true and a logic zero for an OR condition that holds false, is outputted at the right side output.

Boolean NOT Rule Step depicted by 128 also functions as a logic step. When the Boolean NOT rule step is placed in the rules window its graphical depiction includes an output on its right side and an input on its left side. The NOT rule step inverts an input and is also referred to as an inverter rule step. For example, if a true value in the form of a logic one is inputted at the input of the Boolean NOT rule step a false value in the form of a logic zero is outputted at the output of the Boolean NOT rule step.

The Max Rule Step depicted by 130 finds the input value that has the largest value and outputs it. When the Max rule step is placed in the rules window its graphical depiction includes an output on its right side, a top left side input preferably capable of handling only one connection, and a bottom left side input preferable capable of handling multiple connections. All inputs are processed to fine the largest value and this value is outputted at the right side output.

Min Rule Step depicted by 132 finds the input value that has the smallest value and outputs it. When the Min rule step is placed in the rules window its graphical depiction includes an output on its right side, a top left side input preferably capable of handling only one connection, and a bottom left side input preferable capable of handling multiple connections. All inputs are processed to fine the smallest value and this value is outputted at the right side output.

Absolute (Abs) Value Rule Step depicted by 134 finds the absolute value of the input value and outputs it. When the Absolute Value rule step is placed in the rules window its graphical depiction includes an output on its right side and an input on its left side. Inputs are processed to find the absolute value and this value is outputted at the right side output.

Switch Rule Step depicted by 136 takes a value input at a top input, if that value is true it outputs a middle value, and if it is false a bottom input is outputted. Specifically, when the Switch rule step is placed in the rules window its graphical depiction includes an output: on its right side, a top left side input preferably capable of handling only one connection, a middle left side input preferably capable of handling only one: connection and a bottom left side input preferable capable of handling only one connection.

List Rule Step depicted by 138 classifies things as enumerations. In use and for example, a user would first select an item from a classification such as a bearing, which would result in an operand step appearing in the rule step window. Then the user would place a List Rule Step and an Equal step into the rules window. The user would then connect both the bearing classification and the list rule step to the equal step which would result in the List Rule step being filled with values that are associated with the bearing which can then be individually selected. Thus, the user does not have to know all the values associated with an element such as a bearing.

F(X) Rule Step depicted by 140 is an output step that outputs a derived value. The user would define a function and store it as an individual F(X) Rule. Alternatively, a user can store an output of a rule as an individual F(X) Rule. For example, and if a rule included eight input's to an addition step and then the output was divided by eight in a division step an average value would be obtained and inputted to a F(X) Rule step which can then be stored and used in building subsequent rules. When the F(X) Rule step is placed in the rules window its graphical depiction includes an output on its right side and as many inputs as is required for the defined function.

Temp Rule Step depicted by 144 takes the user back to the screen to select more input steps.

True/False Rule Step depicted by 146 is an output step that outputs a true or a false value as defined by the user.

Rule Step depicted by 148 is derived value that can be used in other rules.

Result Rule Step depicted by 150 is the rule step that outputs the result of the custom rule.

FIGS. 16 through 28 illustrate one preferred form of each of tables 64 that are included in the custom rule set database 60. Each table includes at least one record having at least one field.

Specifically, FIG. 16 illustrates a rule groups table 260 showing a record comprised of the following fields: rule_group_id, rule_group_guid, group_priority, is_rule_group_active, rule_group text_id, rule_group_text, rule_type, is_password_active, and rule_group_password.

The rule_group_id is the unique identifier for rule groups. Every rule that is written is assigned a group. The group that a rule belongs to determines the set of rules that it's priority is grouped with (order that the rule is run), who can view and edit the rule, and whether the: group of rules is active. The rule_group_id is the local identifier. Between the databases the rule_group_guid must be checked to verify the valid rule group.

The rule_group_guid is an ID that is assigned to a rule group when it is created. The rule_group_guid is a unique number that is kept unique between different databases. If a rule group is copied from one database to another the result_guid is copied with it.

The group_priority is the priority that all of the rules that belong to that group are run. All of the rule groups will be read in order of group_priority. Then each of the groups rules will be run. For example, a group_priority is 1 is the first group of rules that will be run and a group_priority is 32,767 will be the last group of rules to be run.

When the is_rule_group_active is true then, all of the rules that are part of the rule group (rule_group_id) should be run. If the is rule_group_active is false then, none of the rules that are part of the rule group (rule_group_id) should be run.

The rule_group_text_id is a text_id of the text that is displayed to describe the rule group. This text is only shown to the user if rule_group_text_id<>0. If rule_group_text_id=0, then the text in rule_group_text should be used.

The rule_group_text is the text that is displayed to describe the rule group. This text is only shown to the user if rule_group_text_id=0.

The rule_type enumeration stores what type the rule was created as. The system 10 allows the user to create three separate types of rules. One for a derived value that can be used in any other rule. One for remapping an existing result severity and another for a user defined custom reportable result.

The is_password_active enumeration is true if the rule_group_password is active. This means that to see or edit any of the rules, derived values or custom rules the rule group must be activated by entering the correct password.

The rule_group_password is the password that must be typed in to activate an ability to view and edit that groups rules, custom results, and derived values.

FIG. 17 illustrates a rules table 262 showing a record comprised of the following fields: rule_id, beg_rule_conf_id, end_rule_conf_id, rule_text, rule_text_id, is_valid, is_active, is_deleted, rule_priority, rule_group_id, component_key, and num_result_steps.

The rule_id is the unique identifier for each rule. Changes to rules can be tracked by using the beg_rule_conf_id and end_rule_conf_id. rule_id is used as part of the foreign key in all of the rule step tables. This is how one can find all of the rules steps that belong to a given rule_id.

The beg_rule_conf_id stores the most recent rule_conf_id when a rule or rule step was created. Note that every time a change is made in the system 10 a new rule_conf_id is created. The rule_conf_id is then used to flag all new rule, rule steps, or changed rules or rule steps.

The end_rule_conf_id stores the last rule_conf_id for which a rule or rule step is valid. Note that every time a change is made in the system 10 a new rule_conf_id is created. The rule_conf_id is then used to flag all new rule, rule steps, or changed rules or rule steps.

The rule_text is the text that is displayed as the name of the rule. This text is only shown to the user if rule_text_id=0.

The rule_text_id is the text_id of the text that is displayed as the name of the rule. This text is only shown to the user if rule_text_id <>0. If rule_text_id=0, then the text in rule_text should be used.

The is_valid enumerates that the rule is good and can be executed.

The is_active enumerates that the rule is active and should be executed during rule processing.

The is_deleted enumerates that the rule has been deleted. The rule has not been removed from the database so that we can still show the history of the rules.

The rule_priority stores the order that rules should be run. The rule_priority only indicates the order of rule processing within a given rule group. Each rule group is prioritized by group_priority. A rule_priority of one is the first rule that will be run and a rule_priority of 2,147,483,648 would be the last rule to be run.

The rule_group id is the unique identifier for rule groups. Every rule that is written is assigned a group. The group that a rule belongs to determines the set of rules that it's priority is grouped with (order that the rule is run), who can view and edit the rule, and whether the group of rules is active.

The component_key is a unique identifier for components in the database.

The num_result_steps is the number of result steps on a given rule (rule_id).

FIG. 18 illustrates a rule steps table 264 showing a record comprised of the following fields: rule_id, beg_rule_conf_id, end_rule_conf_id, step_num, vert_position_num, horz_position_num, and operation_id.

The rule_id is the unique identifier for each rule. Changes to rules can be tracked by using the beg_rule_conf_id and end_rule_conf_id. rule_id is used as part of the foreign key in all of the rule step tables. This is how one can find all of the rules steps that belong to a given rule_id.

The beg_rule_conf_id stores the most recent rule_conf_id when a rule or rule step was created. Every time a change is made in the system 10 a new rule_conf_id is created. The rule_conf_id is then used to flag all new rule, rule steps, or changed rules or rule steps.

The end_rule_conf_id stores the last rule_conf_id for which a rule or rule step is valid. Every time a change is made in the system 10 a new rule_conf_id is created. The rule_conf_id is then used to flag all new rule, rule steps, or changed rules or rule steps.

The step_num is used to identify each of the individual rule steps in a rule. The step_num starts with 1 for the first step that is added and is incremented by one for each additional step that is added to the rule. The step_num is part of the primary key for the Rule Steps table. Every rule step has a record in the Rule Steps table and is given a step_num when it is created. Each rule step can have records in other tables step_num is used to find those other records that belong to a given rule step.

The vert_position_num stores the vertical location of the rule step. This is the vertical position where the rule is displayed on the display. The vert_position_num is also used to order rule step processing. The horz_position_num is the most important for rule processing order.

The horz_position_num stores the horizontal location of the rule step. This is the horizontal position where the rule is displayed on the display. The horz_position_num is the major value used to order rule step processing. All rule steps that have the same horz_position_num can be processed in any order.

The operation_id is the identifier for each of the supported operations. There is one record for each type of operation add, subtract etc. supported in the custom rules processor.

FIG. 19 illustrates a rule connections table 266 showing a record comprised of the following fields: rule_id, beg_rule_conf_id, end_rule_conf_id, connection_num, from_step_num, from_output_num, to_step_num, and to_input_num.

The rule_id is the unique identifier for each rule. Changes to rules can be tracked by using the beg_rule_conf_id and end_rule_conf_id. The rule_id is used as part of the foreign key in all of the rule step tables. This is how one can find all of the rules steps that belong to a given rule_id.

The beg_rule_conf_id stores the most recent rule_conf_id when a rule or rule step was created. Every time a change is made in the system 10 a new rule_conf_id is created. The rule_conf_id is then used to flag all new rule, rule steps, or changed rules or rule steps.

The end_rule_conf_id stores the last rule_conf_id for which a rule or rule step is: valid. Every time a change is made in the system 10 a new rule_conf_id is created. The rule_conf_id is then used to flag all new rule, rule steps, or changed rules or rule steps.

The connection_num stores the number of the connection in the rule. This is part of the primary key for looking up connections in the rule. Connections are made from a rule step output to a rule step input. Every connection in the rule gets its own connection_num.

The from_step_num is the step_num of the rule step that has the output side of the connection.

The from_output_num is the output num of the rule step output that the connection is connected to.

The to_step_num is the step_num of the rule step that has the input side of the connection.

The to_input_num is the input_num of the rule step input that the connection is connected to.

FIG. 20 illustrates a rule step inputs table 268 showing a record comprised of the following fields: rule_id, beg_rule_conf_id, end_rule_conf_id, step_num, input_num, step_input_enum_id, and step_input_enum_id.

The rule_id is the unique identifier for each rule. Changes to rules can be tracked by using the beg_rule_conf_id and end_rule_conf_id. rule_id is used as part of the foreign key in all of the rule step tables. This way one can find all of the rules steps that belong to a given rule_id.

The beg_rule_conf_id stores the most recent rule_conf_id when a rule or rule step was created. Every time a change is made in system 10 a new rule_conf_id is created. The rule_conf_id is then used to flag all new rule, rule steps, or changed rules or rule steps.

The end_rule_conf_id stores the last rule_conf_id for which a rule or rule step is valid. Every time a change is made in Rule Desk a new rule_conf_id is created. The rule_conf_id is then used to flag all new rule, rule steps, or changed rules or rule steps.

The step_num is used to identify each of the individual rule steps in a rule. The step_num starts with one for the first step that is added and is incremented by one for each additional step that is added to the rule. The step_num is part of the primary key for the Rule Steps table. Every rule step has a record in the Rule Steps table and is given a step_num when it is created. Each rule step can have records in other tables and step_num is used to find those other records that belong to a given rule step.

Each rule operation can have multiple inputs. Input_num identifies which input the records data describes.

The value_type stores the type of value in or out of a rule step. This is used to retrieve the values and to verify proper connection attachment when creating new rules.

The step input_enum_id is the enum_id of the rule step input. A zero step_input_enum_id indicates that the input is not an enumeration value.

FIG. 21 illustrates a rule outputs table 270 showing a record comprised of the following fields: rule_id, beg_rule_conf_id, end_rule_conf_id, step_num, output_num, value_type, b_value, f_value, i_value, e_value, units, sub_units, field_id, component_key, step_output_enum_id, and loop_num.

The rule_id is the unique identifier for each rule. Changes to rules can be tracked by using the beg_rule conf_id and end_rule_conf_id. rule_id is used as part of the foreign key in all of the rule step tables. This is how one can find all of the rules steps that belong to a, given rule_id.

The beg_rule_conf_id stores the most recent rule_conf_id when a rule or rule step was created. Every time a change is made in the system 10 a new rule_conf_id is created. The rule_conf_id is then used to flag all new rule, rule steps, or changed rules or rule steps.

The end_rule_conf_id stores the last rule_conf_id for which a rule or rule step is valid. Every time a change is made in system 10 a new rule_conf_id is created. The rule_conf_id is then used to flag all new rule, rule steps, or changed rules or rule steps.

The step_num is used to identify each of the individual rule steps in a rule. The step_num starts with one for the first step that is added and is incremented by one for each additional step that is added to the rule. The step_num is part of the primary key for the Rule Steps table. Every rule step has a record in the Rule Steps table and is given a step_num when it is created. Each rule step can have records in other tables and the step_num is used to find those other records that belong to a given rule step.

Each rule operation can have multiple outputs. The ouput_num identifies which output the records data describes.

The value_type stores the type of value in or out of a rule step. This is used to retrieve the values and to verify proper connection attachment when creating new rules.

The b_value is the value of the Rule Step output if the value_type is Boolean.

The f_value is the value_type of the Rule Step output if the value_type is float.

The i_value is the value of the Rule Step output, if the value_type is integer. If the value_type is an enumeration then the enum_value number is stored in i_value.

The e_value is the enum_id value of the Rule Step output, if the value_type: is an enumeration. The enum_value for look up of the actual enumeration will be in i_value.

Units is the unit type that the rule step output was stored as. This can be used for verifying unit types or conversion of unit types. This will most likely only be necessary when class based rules are added.

The sub_units is the sub_unit type that the rule step output was stored as. This can be used for verifying sub unit types or conversion of sub unit types. This will most likely only be necessary when class based rules are added.

The field_id is a number used to specify a specific field in the database. This number can be used to look up pertinent data to be able read and write the field information from the Fields table.

The component_key is a unique identifier for components in the database.

The step output_enum_id is the enum_id of the rule step output. A step_output_enum_id having a value of zero indicates that the output is not an enumeration value.

The loop_nun is the number of the field if more than one can be available. An example would be for exhaust temperatures. There can be multiple exhaust temperatures on a turbine loop_num would be the number of the exhaust temperature point.

FIG. 22 illustrates a result steps table 272 showing a record comprised of the following fields: rule_id, beg_ rule_conf_id, end_rule_conf_id, step_num, result_type, multiple_severities, create_severity_0_result, auto_staus_checking, and no_result.

The rule_id is the unique identifier for each rule. Changes to rules can be tracked by using the beg_rule_conf_id and end_rule_conf_id. rule_id is used as part of the foreign key in all of the rule step tables. This is how one can find all of the rules steps that belong to a given rule_id.

The beg_rule_conf_id stores the most recent rule_conf_id when a rule or rule step was created. Every time a change is made in the system a new rule_conf_id is created. The rule_conf_id is then used to flag all new rule, rule steps, or changed rules or rule steps.

The end_rule_conf_id stores the last rule_conf_id for which a rule or rule step is valid. Every time a change is made in the system 10 a new rule_conf_id is created. The rule conf_id is then used to flag all new rule, rule steps, or changed rules or rule steps.

The step_num is used to identify each of the individual rule steps in a rule. The step_num starts with one for the first step that is added and is incremented by one for each additional step that is added to the rule. The step_num is part of the primary key for the Rule Steps table. Every rule step has a record in the Rule Steps table and is given a step_num when it is created. Each rule step can have records in other tables and the step_num is used to find those other records that belong to a given rule step.

The result_type is the number used in the system 10 to identify a reportable result. The result_type is more like a local nickname for the result. This number can be different for the same type of result in a different database. The result guid is a unique number that can be used to positively identify results between databases.

The multiple_severities is selectable by the user. If the user wants to be able to fire multiple severity levels with one result step then they enable multiple severities in the properties of the rule step. The multiple_severities is true if the user selects and activates the multiple severity option.

The create_severity_0_result is selectable by the user. If create_severity_0_result is true, then the user has selected to have a severity zero result created.

The auto_staus_checking is selectable by the user. If auto_staus_checking is true, then the user has selected to have automatic status checking of all values used in the rule. If any of the variables use in the rule are not useable then a zero severity is created and a display and a data sufficiency result is also created.

The no_result is a flag to indicate weather an input should be shown that allows the result to not be created if the value into it is evaluated to true.

FIG. 23 illustrates a derived value steps table 274 showing a record comprised of the following fields: rule_id, beg_rule_conf_id, end_rule_conf_id, step_num, and step_num.

The rule_id is the unique identifier for each rule. Changes to rules can be tracked by using the beg_rule_conf_id and end_rule_conf_id. rule_id is used as part of the foreign key in all of the rule step tables. This is how one can find all of the rules steps that belong to a given rule_id.

The beg_rule_conf_id stores the most recent rule_conf_id when a rule or rule step was created. Every time a change is made in the system a new rule_conf_id is created. The rule_conf_id is then used to flag all new rule, rule steps, or changed rules or rule steps.

The end_rule_conf_id stores the last rule_conf_id for which a rule or rule step is valid. Every time a change is made in the system 10 a new rule_conf_id is created. The rule_conf_id is then used to flag all new rule, rule steps, or changed rules or rule steps.

The step_num is used to identify each of the individual rule steps in a rule. The step_num starts with one for the first step that is added and is incremented by one for each additional step that is added to the rule. The step_num is part of the primary key for the Rule Steps table. Every rule step has a record in the Rule Steps table and is given a step_num when it is created. Each rule step can have records in other tables and the step_num is used to find those other records that belong to a given rule step.

The derived_value_id is the number used in the system to identify a derived value. The derived_value_id is more like a local nickname for the derived value. This number can be different for the same type of derived value in a different database. The derived_value_id is a unique number that can be used to positively identify derived values between databases.

FIG. 24 illustrates a system options table 276 showing a record comprised of the following fields: system_options_key, database_major_version, database_minor_version, and database_custom_version.

The system_options_key is the primary key for the System Options table. This table should only have one record.

The database_major_version is the major version of the database. When major changes to the database occur one can roll the major version.

The database_minor_version is the minor version of the database. When minor changes to the database occur one can roll the minor version. Whenever the database_major_version is incremented the database_minor_version should be set back to one.

The database_custom_version is the custom version of the database. If one creates a custom version of the database then one can distinguish these changes with the database_custom_version.

FIG. 25 illustrates a class hierarchy table 278 showing a record comprised of the following fields: component_type, ancestor_component_type, and ancestor_level.

The component_type stores the type of the component. There must be an entry in a "Component Types" table to define every component defined in the range.

The ancestor_component_type stores the type of the component that a component_type inherits from in acquisition database.

The ancestor_level is how far up the ancestor tree the ancestor_component_type is. ancestor_level having a value of one is a parent ancestor_component_type. ancestor_level having a value of two is a grandparent ancestor_component_type et cetera.

FIG. 26 illustrates an English text table 280 showing a record comprised of the following fields: text_id and english_text.

The text_id is a number that is used to look up an actual text value in a string table in a separate DLL. Text_ids are used to make internationalization easier.

Please note the following:

The text_id is used instead of actual text in the database. The reason the system 10 uses a text identifier is that it can define text in the database as a number while having the actual text is stored in a string table in a language module. This is done for internationalization. If one were to put our text in the database then it would create problems for the internationalization of system 10.

A text value that can be either entered by a developer or the user includes both a text_id and a regular text field. In this case one can always start by looking at the text_id field. If the text_id field <>0 then one would look up the value in the language module. If the text_id=0 then the value in the actual text field typed in by the user would be used.

Without using text_ids some of the problems would be:

If the database is translated into Japanese all the text will all be in Japanese. This would be the case even if the user has an English version of the display module.

It would be harder for a translation group to figure out what text needs to be translated in the database. Now all they need to do is use their tools and translate all the text in the one string table. This is much easier and more reliable.

An additional benefit is that one only needs to pass a number across a connection, not the whole string. This can make a large performance improvement when connected through a modem.

The english_text is copy of the text that is in the English version of the text_id. This field should never be used directly. This field is for reference. The text_id can return a value from this table if the string does not exist in the string table. This should only happen if an old version of the text_id is being used with a newer version of the database. This ability is so that if you had a Japanese version of the system 10 connected to a database that has text_ids that your text_id does not have values for it will not return a blank but rather the English version of the text instead.

Thus, and in essence, text is stored as a text identification number (a text_id number) so that it can be internationalized. The text identification number associates a number to different types of text, for example, a letter, a symbol, a number, a word or a string of letters, symbols, numbers, and/or words. Code can then be used to send the language module a number which is returned to the system 10 as text thereby allowing all the text in the database to be written and stored as text identification numbers which can later be easily translated by code that associates the text characters to stored text identification numbers for obtaining a database that can be written in any language.

FIG. 27 illustrates an English memo text table 282 showing a record comprised of the following fields: text_id and english_memo_text.

The text_id is a number that is used to look up an actual text value in a string table in a separate language module. Text_ids are used to make internationalization easier.

The english_memo_text is only used if the text is too big to fit in the english_text field and is a copy of the text that is in the English version of the text_id. This field should never be used directly. This field is here for reference. The text_id can return a value from this table if the string does not exist in the string table. This should only happen if a old version of the text_id is being used with a newer version of the database. This ability is so that if you had a Japanese version of the system 10 connected to a database that has text_ids that your text_id does not have values for it will-not return a blank but rather the English version of the text instead.

FIG. 28 illustrates a properties text table 284 showing a record comprised of the following fields: property_texts_id, pp_text_id, ds_text_id, rack_text_id, mon_text_id, chan_text_id, and t_text_id.

The property_texts_id is the unique identifier for the record that contains the text id values for each of the property values.

The pp_text_id is the text id that is used to describe the set of all pp values.

The ds_text_id is the text id that is used to describe the set of all ds_ values.

The rack_text_id is the text id that is used to describe the set of all rack_ values.

The mon_text_id is the text id that is used to describe the set of all mon_ values.

The chan_text_id is the text id that is used to describe the set of all chan_ values.

The t_text_id is the text id that is used to describe the set of all t_ values.

Moreover, having thus described the invention, it should be apparent that numerous structural modifications and adaptations may be resorted to without departing from the scope and fair meaning of the present invention as set forth hereinabove and as described hereinbelow by the claims.

We claim:

1. A custom rule system for creating custom rules, said custom rule system comprising in combination:

a processor, a memory and a display both operatively coupled to said processor;

a plurality of operand and operation rule steps stored within said memory;

means for displaying to a user graphical icons of said plurality of operand and operation rule steps stored within said memory as a pallet on a first area of said display such that said pallet is comprised of a plurality of individual graphical operand and operation icons each corresponding to at least one of said operand and operation rule steps;

means for a user to sequentially select a plurality of icons from said pallet and arrange said plurality of sequentially selected icons as an ordered series of icons on a second area on said display; and means for a user to interconnect said plurality of sequentially selected icons sequentially arranged as said ordered series of icons on said second area of said display for creating a custom rule comprised of said user selected and interconnected ordered series of icons created by the user, and means for storing, in a database, said user created custom rule as an ordered series of operand and operation rule steps corresponding to said user selected and interconnected ordered series of icons created by the user such that said operand and operation rule steps are processed in the same order in which they are stored in said database resulting in the processing of said user created custom rule in accordance with the same order as said user selected and interconnected ordered series of icons created by the user.

2. The system of claim 1 wherein said means for the user to sequentially select and interconnect said plurality of sequentially selected icons includes means for a user to select, drag, and drop said plurality of sequentially selected icons from said pallet to said second area on said display and then interconnect said plurality of sequentially selected icon for creating said user created custom rule.

3. The system of claim 1 further including an extraction module for extracting information engendered from sensors and a processor operatively coupled to both said extraction module and said database for processing said extracted information according to said user created custom rule having said ordered series of operand and operation rule steps having said same order as said user selected and interconnected ordered series of icons created by the user such that said processor processes each rule step in said ordered series of operand and operation rule steps as they are stored in the database.

4. A custom rule system for creating custom rules, said system comprising in combination:
- a database comprised of a multiplicity of operand and operation rule steps, each said rule step having specific executable code associated therewith;
- a computer operatively coupled to said database and including a display for displaying to a user graphical depictions of said multiplicity of operand and operation rule steps stored within said database as an array of a multiplicity of individual graphical operand and operation depictions displayed within a first window on said display and each corresponding to at least one of said multiplicity of operand and operation rule steps;
- means for displaying a rules window on said display;
- means for a user to interface with said array displayed in said first window to select and place a plurality of said multiplicity of individual graphical operand and operation depictions from said array to said rules window as a user ordered series of selected and placed depictions; and
- means for a user to interconnect said plurality of selected and placed depictions such that a custom rule is created by the user defined by said user ordered series of said user selected, placed, and interconnected depictions; and
- means for storing, in said database, said user created custom rule as an ordered series of operand and operation rule steps corresponding to said by said user ordered series of said user selected, placed, and interconnected depictions; and
- an extraction module for extracting information engendered from sensors and a processor operatively coupled to both said extraction module and said database for processing said operand and operation rule steps in the same order in which they are stored in said database resulting in the processing of said user created custom rule in accordance with the same order as said user ordered series of said user selected, placed, and interconnected depictions.

5. The system of claim 4 further including a step reference stored within said database for referencing said specific executable code associated with each operand and operation rule step that corresponds to each of said plurality of selected and placed depictions displayed in said rules window.

6. The system of claim 5 further including means for providing a decision based upon said processing of said user created custom rule.

7. The system of claim 6 further including means for routing said decision based upon said processing of said user created custom rule to appropriate personal.

8. The system of claim 7 further including a plurality of tables stored within said database, each having at least one record containing fields and a plurality of said fields including said step references each associated with each operand and operation rule step that corresponds to each of said user selected, placed, and interconnected depictions created by the user.

9. A method for creating custom rules, the steps including:
- storing individual operand and operation rule steps comprised of executable code within a database coupled to a computer;
- depicting said operand and operation rules steps on a display of said computer as a graphical arrangement of operand and operation icons;
- creating a user defined custom rule by interfacing with said graphical arrangement of operand and operation icons for selecting and placing a plurality of said operand and operation icons from said graphical arrangement to a graphical window on said display in a user ordered series and interconnecting said icons placed within said graphical window for creating said user defined custom rule defined by said user ordered series of selected, placed, and interconnected icons, and
- storing, in said database, said user defined custom rule as an ordered series of operand and operation rule steps corresponding to said user ordered series of selected, placed, and interconnected icons and processing said rule steps in said ordered series of operand and operation rule steps in the same order in which they are stored in said database resulting in the processing of said user defined custom rule in accordance with the same order as said user ordered series of said user selected, placed, and interconnected icons.

10. The method of claim 9 further including the steps of extracting information engendered from sensors and providing a processor operatively coupled to both said extraction module and said database for processing said operand and operation rule steps in the same order in which they are stored in said database resulting in the processing of said user defined custom rule in accordance with the same order as said user ordered series of said user selected, placed, and interconnected icons.

* * * * *